United States Patent
Taylor, Jr. et al.

(10) Patent No.: US 11,880,554 B2
(45) Date of Patent: Jan. 23, 2024

(54) OVERFLOW APPLICATION TOOL FOR COMPUTING DEVICES

(71) Applicant: MICROSOFT TECHNOLOGY LICENSING, LLC, Redmond, WA (US)

(72) Inventors: Charles Edward Taylor, Jr., Seattle, WA (US); Peter E. Hammerquist, Seattle, WA (US); Benjamin J. Schoepke, Seattle, WA (US); Jessica Leigh Douma, Seattle, WA (US); Albert Peter Yih, Seattle, WA (US); Emilia Marie Nobrega, Seattle, WA (US); Hadley Meryl Griffin, Seattle, WA (US); Ashley Nicole Ferguson, Shelton, WA (US); Robert Joseph Disano, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/506,580

(22) Filed: Oct. 20, 2021

(65) Prior Publication Data
US 2023/0123345 A1    Apr. 20, 2023

(51) Int. Cl.
*G06F 9/451*    (2018.01)
*G06F 3/0482*   (2013.01)
(Continued)

(52) U.S. Cl.
CPC ........ *G06F 3/04845* (2013.01); *G06F 3/0482* (2013.01); *G06F 3/0485* (2013.01); *G06F 3/04817* (2013.01); *G06F 9/451* (2018.02)

(58) Field of Classification Search
None
See application file for complete search history.

(56) References Cited

U.S. PATENT DOCUMENTS 6,232,972 B1 *  5/2001  Arcuri ..................... G06F 9/453
                                                  715/830
7,512,904 B2 *  3/2009  Matthews ............. G06F 3/0482
                                                  715/733
(Continued)

FOREIGN PATENT DOCUMENTS

EP       1669848 A2    6/2006

OTHER PUBLICATIONS

"IPadOS 15 Preview—Apple", Retrieved from: https://www.apple.com/ipados/ipados-preview/, Retrieved Date: Sep. 14, 2021, 30 Pages.

(Continued)

*Primary Examiner* — Henry Orr
(74) *Attorney, Agent, or Firm* — SHOOK, HARDY & BACON L.L.P.

(57) ABSTRACT

Computerized systems and methods are provided for automatically generating an application overflow tool that is dynamically updated and arranged to provide improved access to popular or recently used applications. These systems and methods improve existing technologies by generating an overflow panel different from a task bar, such that the overflow panel provides access to most recently used applications that are not on the task bar. As such, ease of access to applications is improved to increase user efficiency. These systems also improve the way computers operate by leveraging existing GUI layouts to reduce computing resource consumption, such as memory, network latency, I/O, and the like, that would otherwise be required improve access to applications.

20 Claims, 15 Drawing Sheets

(51) Int. Cl.
G06F 3/04845 (2022.01)
G06F 3/04817 (2022.01)
G06F 3/0485 (2022.01)

(56) References Cited

U.S. PATENT DOCUMENTS

| | | | | |
|---|---|---|---|---|
| 9,612,847 | B2* | 4/2017 | Deutsch | G06F 3/0482 |
| 2004/0113948 | A1* | 6/2004 | Shahrbabaki | G06F 3/0483 |
| | | | | 715/777 |
| 2006/0031849 | A1* | 2/2006 | Barta | G06F 9/4843 |
| | | | | 719/320 |
| 2006/0074929 | A1* | 4/2006 | Weber | G06F 16/10 |
| 2006/0161889 | A1* | 7/2006 | Stabb | G06F 9/45512 |
| | | | | 717/113 |
| 2006/0224989 | A1 | 10/2006 | Pettiross et al. | |
| 2009/0024953 | A1* | 1/2009 | Selig | G06F 40/174 |
| | | | | 715/781 |
| 2012/0296959 | A1* | 11/2012 | Momchilov | H04L 67/303 |
| | | | | 709/203 |
| 2013/0262385 | A1* | 10/2013 | Kumarasamy | G06F 16/275 |
| | | | | 707/634 |
| 2017/0300555 | A1 | 10/2017 | Zarick et al. | |

OTHER PUBLICATIONS

Russo, Randy, "Work Life Balance", Retrieved from: https://www.apple.com/105/media/us/ipados/ipados-preview/2021/c06a0514-088d-4c69-ade1-12ec3b8c76a1/anim/multitasking_3/large.mp4, Jun. 7, 2021, 1 Page.

"International Search Report and Written Opinion Issued in PCT Application No. PCT/US22/039762", dated Dec. 1, 2022, 16 Pages.

* cited by examiner

OVERFLOW APPLICATION TOOL FOR COMPUTING DEVICES

BACKGROUND

As computational efficiency has improved, computing devices have been able to run an increased number of applications, thereby delivering diverse functionality to individuals and enterprises. Computing devices may generate indicators, such as icons, corresponding to the applications. These indicators may include a branded visualization or control (e.g., user interface element) useful in visually distinguishing the applications from one another. To help a user find a target application, computing devices have implemented various organizational strategies. For example, certain computing systems generate a scrollable list of applications, while others generate pages of application indicators. Other organizational strategies include a task bar of pinned or popular application indicators to facilitate access to the corresponding pinned application.

OVERFLOW APPLICATION TOOL FOR COMPUTING DEVICES SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The technologies described in this disclosure are directed toward computerized systems and methods for automatically generating an overflow tool that is dynamically updated and chronologically organized to provide improved access to popular or recently used applications. At a high level and according to some embodiments, this occurs by first generating, via a computing device, a graphical user interface (GUI) that may include a task bar, a most recently used (MRU) slot, and/or an overflow expansion control. Since space on the task bar may be limited, the number of application indicators that may be added to the task bar may be limited. As such, embodiments of the present disclosure provide an overflow tool that generates an overflow panel for display proximate to the task bar. The overflow panel includes a dynamically arranged listing of application indicators that correspond to applications that are currently in use on the computing device, and that are not already directly selectable from the task bar. The overflow panel may be generated based on a determination that certain application indicators do not fit on the task bar. In addition or alternatively, the overflow panel may be generated in response to a user interaction. The application indicators on the overflow panel are hereinafter referred to as "overflow application indicators".

In certain embodiments, the overflow panel includes a collinear listing of overflow application indicators that are chronologically arranged based on which overflow applications were most recently used. The overflow panel may receive a user interaction with an overflow application indicator. In response to the user interaction with the overflow application indicator, the computing device may generate an extended user interface element providing a preview of the overflow application corresponding to the overflow application indicator with which the user has interacted. The extended user interface element may be located proximate to the overflow panel.

With this in mind, various embodiments of the present disclosure address problems associated with the limited space on a display and on a task bar, while not compromising selection precision, such as for computing device allowing for touch selection. As such, the user experience may be improved by enhancing the efficiency by which users are able to access applications which may be running either in an active or suspended state, but not pinned or present on the task bar. Moreover, in accordance with various embodiments of the present disclosure, the overflow panel may be employed as an extension of the task bar, such that the overflow application indicators are configured to be placed after or proximate to the application indicators of the task bar, but the coordinate space of the overflow panel is offset from that of the task bar to appear as a separate feature on the GUI. In this manner, computational efficiency may be improved since existing layouts and designs of the GUI may be leveraged in generating the overflow panel.

BRIEF DESCRIPTION OF THE DRAWINGS

Aspects of the disclosure are described in detail below with reference to the attached drawing figures, wherein.

DETAILED DESCRIPTION

Figure 1:
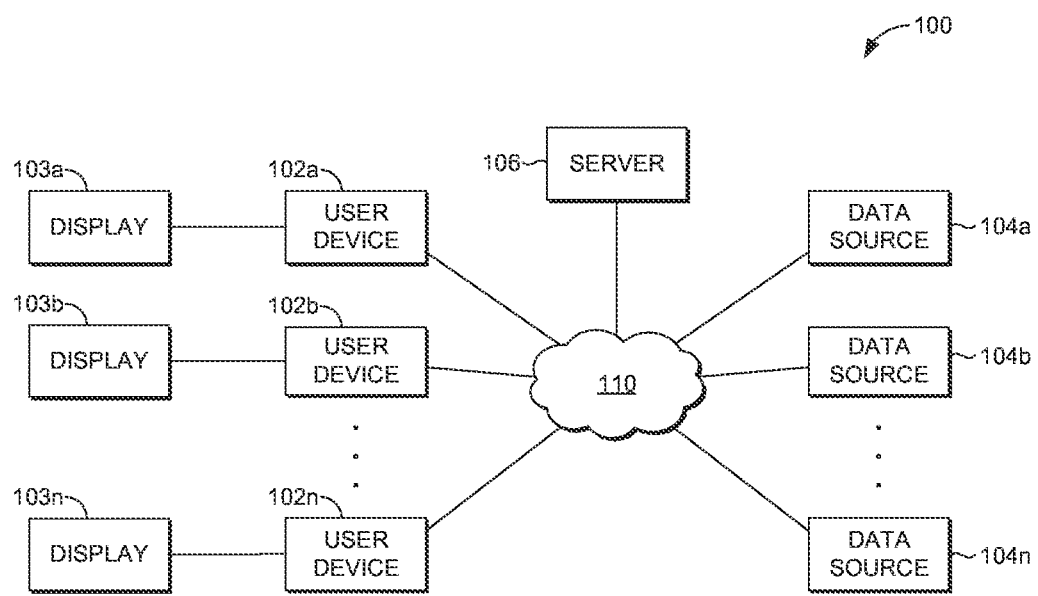
FIG. 1 is a block diagram of an exemplary computing environment suitable for use in implementing some embodiments of this disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Conventional application organizational technologies do not provide efficient access to an ever-increasing number of applications. Some solutions may allow users to organize application indicators (e.g., icons) into target placements on a home screen, into different pages, into folders, and the like. For example, some approaches may allow users to pin indicators of selected applications to a task bar. However, these task bars may quickly run out of space, generally limiting the convenience and ease of accessing applications that do not fit on the task bar. Accordingly, there is a need to improve the ease by which users are able to access certain applications, while preserving aspects of the graphical user interface (GUI) design, such as the task bar, which provides at least some base functionality to users.

With this in mind, the technologies described in this disclosure are generally directed to computerized systems and methods for automatically generating an overflow panel that is dynamically updated to display the most relevant overflow applications, thereby improving the ease of access to overflow applications. As used herein and as set forth above, "overflow applications" generally refers to applications that are not associated with or pinned to a task bar. At a high level, certain embodiments include generating a GUI that includes various applications and a task bar, for example, that may be positioned along a width of the bottom of the GUI.

Generation of the GUI may be based on an operating mode or orientation of the computing device. For example, a computing device oriented in a tablet mode may display a GUI that includes application indicators, such that the GUI may be presented in a landscape view having a width that is greater than a height of the display surface. As another example, a computing device oriented in a desktop mode may display a GUI that includes application indicators, such that the GUI is presented in a portrait view having a height that is greater than a width of the display surface.

In either case, the GUI may include a task bar on which indicators corresponding to target or popular applications may be pinned manually or automatically. First, as an example of a manually pinned application, a user may select a GUI control (e.g., right-click on a software application indicator and select a "pin" option) to manually pin the corresponding software application indicator to the task bar. Second, as an example of an automatically pinned software application, a computing system may automatically pin a software application indicator to the task bar based on a variety of factors (e.g., frequency of use, duration of use, user preferences, tracked-user activity, and the like). Applications that are pinned to the task bar are herein referred to as "pinned applications."

In some contexts, certain an indicator corresponding to software applications which are running but that are not pinned to the task bar may nevertheless be presented on the task bar, for example, because there is space on the task bar which is not being used by the pinned applications. As such, in some embodiments, the task bar may include "task bar application indicators," which includes software application indicators on the task bar, such as the indicators for the pinned applications, as well as the indicators for certain unpinned applications. In this way, the task bar application indicators may include indicators for pinned application, unpinned running applications, or both.

As set forth above, the number of application indicators the task bar may accommodate is limited by the size of the display screen. While the size of the application indicators presented on the GUI may be reduced to accommodate more application indicators, it may be desirable to avoid reducing the size of the application indicators beyond a certain size, to maintain precision when selecting the application indicator via any number of selection methods, such as a touch selection, click, and the like. Moreover, existing task bars may not be touch friendly since pinned application indicators presented on task bars are not within the reach of the user's thumb(s) while the user is holding a computing device, such as a tablet, with both hands. As a result, a user may have to reposition the computing device to be able to remove one hand from the computing device and execute a touch selection of an application indicator.

To address these issues, among others, some embodiments of the present disclosure include generating an overflow tool including an overflow panel that includes a dynamically updated listing of application indicators that are not already easily accessible via or associated with the task bar. Certain embodiments include determining that there is insufficient space available on the task bar for the overflow application indicators and assigning the overflow application indicators to an overflow panel. The overflow panel may be generated in response to a first user interaction (such as a selection input, a voice activated command, a hovering over input, or a touch input) with an overflow expansion control positioned collinearly with the task bar. As used herein, when referring to an application, "in use" generally means having been launched and remaining open in either an active or a suspended state. For example, when an application is launched it may remain "in use" until the application is closed and the session is terminated.

In certain embodiments, the overflow panel includes a collinear listing of overflow application indicators in use that are chronologically organized based on which overflow applications were most recently used. The overflow panel may be presented above the task bar and along the right or left regions of the GUI to facilitate selection of the overflow application indicators, for example, when the computing device is in tablet mode. As used herein, "most recently used" applications refers to applications that remain in use (as defined above) and were most recently interacted with by any suitable user action, such as launching the corresponding application, providing an input within the application, minimizing the application, and the like. For example, the overflow panel may present overflow application indicators horizontally from left to right with the indicator for most recently used application on one end, such as the far left end, and the indicator for the overflow application that was least most recently used on the other end, such as the far right end. Alternatively, the overflow panel may include overflow application indicators vertically arranged with the indicator for the most recently used overflow application on one end, such as the top end, and the indicator for the application that was least most recently used on the other end, such as the bottom end.

In certain embodiments, the overflow panel may include any number of features adding additional functionality to the overflow panel. In some embodiments, the indicators for the overflow applications may receive user interactions to assign the corresponding indicator to the task bar. For example, the indicators for the overflow applications may be draggable, such that a user may drag and drop a corresponding overflow application indicator from the overflow panel to the task bar to pin the corresponding overflow application indicator to the task bar. As another example, the indicators for the overflow applications may be selected (e.g., right-clicked) to be added to the task bar.

Additionally or alternatively, the overflow panel may include a panel size adjuster that, when selected, expands or increases the size of the overflow panel, for example, to allow more overflow application indicators to be presented on the overflow panel. The overflow panel may receive a user interaction with an overflow application indicator. In response to the user interaction with the overflow application indicator, the computing device may generate an extended user interface element providing a preview, such as a smaller rendition, of content of the overflow application corresponding to the indicator with which the user interacted. The extended user interface element may be positioned proximate to the overflow panel. For example, the computing device may present the extended user interface element, such that the overflow panel is positioned between the extended user interface element and the task bar. In this manner, the extended user interface element is positioned near the overflow panel to facilitate user selection of the extended user interface element. As another example, the computing device may position the extended user interface element such that one border of the extended user interface element abuts the overflow panel and another border abuts the task bar.

In this manner, the overflow panel addresses problems associated with the limited space on a display, while not compromising the selection precision provided by certain computing devices, such as those allowing for touch selection. As such, the user experience may be improved by enhancing the efficiency by which users are able to access applications that are open, but not pinned or present on the task bar. Moreover, the overflow panel may be programmed as an extension of the task bar, such that the overflow application indicators are placed after or proximate to the application indicators of the task bar, and the coordinate space of the overflow panel is offset from that of the task bar. In this manner, computational efficiency may be improved since existing layouts and designs of the GUI may be leveraged in generating the overflow panel.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor or processing circuitry executing instructions stored in memory.

Among other components not shown, example operating environment 100 includes a number of user devices, such as user devices 102a*n* and 102b through 102n; a number of data sources, such as data sources 104a*n* and 104b through 104n; server 106; displays 103a*n* and 103b through 103n; and network 110. It should be understood that environment 100 shown in FIG. 1 is an example of one suitable operating environment. Each of the components shown in FIG. 1 may be implemented via any type of computing device, such as computing device 1400 described in connection to FIG. 14, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks employing any suitable communication protocol.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. The displays 103a and 103b through 103n may be integrated into the user devices 102a and 102b through 102n. In one embodiment, the displays 103an and 103b through 103n are touchscreen displays.

User devices 102a and 102b through 102n may comprise any type of computing device capable of use by a user. For example, in one embodiment, user devices 102a through 102n may be the type of computing device described in relation to FIG. 14 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) application metric data to application metric collection component 210 of FIG. 2.) Data sources 104a and 104b through 104n may be discrete from user devices 102a and 102b through 102n and server 106. Alternatively, the data sources 104b through 104n may be incorporated and/or integrated into at least one of those components. In one embodiment, one or more of data sources 104a through 104n may be integrated into, associated with, and/or accessible to one or more of the user device(s) 102a, 102b, or 102n or server 106. Examples of applications and/or corresponding data made available by data sources 104a through 104n are described further in connection to application metric collection component 210 of FIG. 2.

Figure 2:
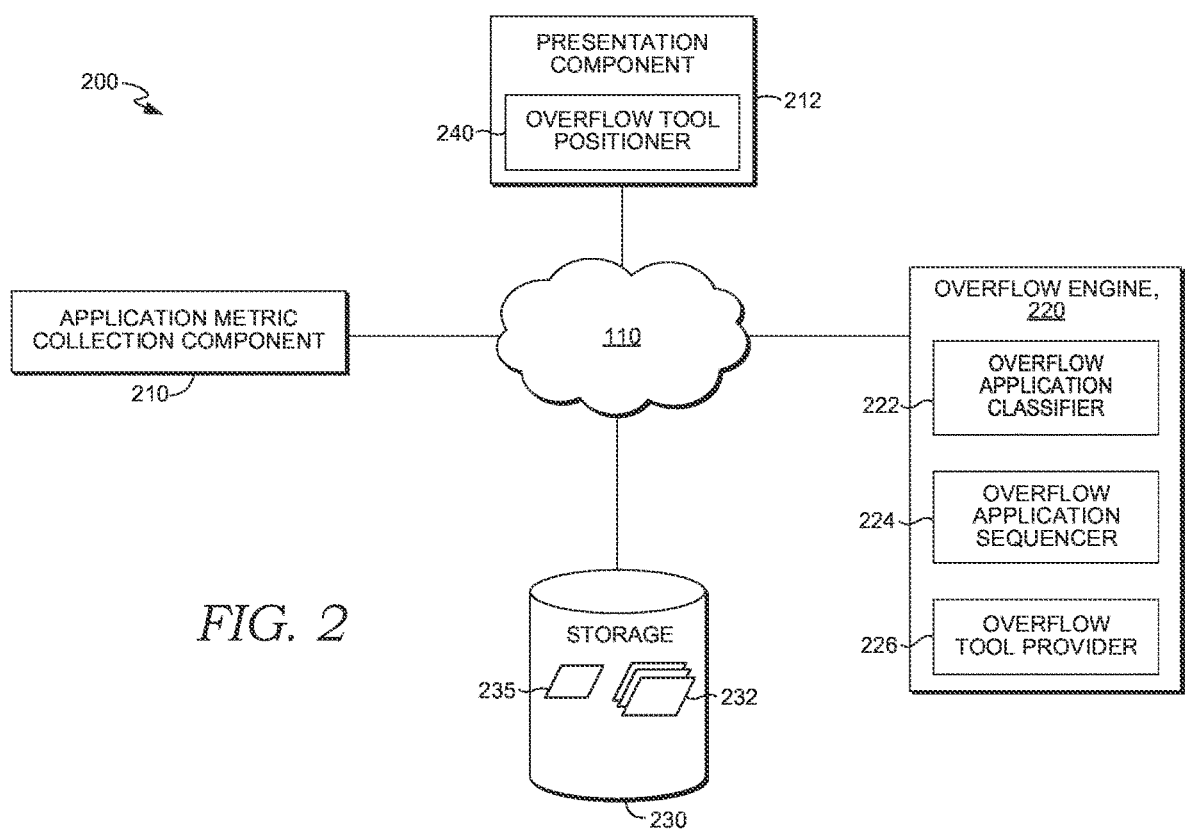
FIG. 2 is a block diagram illustrating an example system in which some embodiments of this disclosure are employed.

Operating environment 100 can be utilized to implement one or more of the components of system 200, described in FIG. 2. Operating environment 100 also can be utilized for implementing aspects of process flow 1200 and 1300 described in FIGS. 12-13, respectively. Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including application metric collection component 210, presentation component 212, overflow engine 220, and storage 230. The application metric collection component 210, presentation component 212, and/or overflow engine 220 may be embodied as a set of compiled computer instructions or functions, program modules, computer software services, or an arrangement of processes carried out on one or more computer systems, such as computing device 1400 described in connection to FIG. 14, for example.

In one embodiment, the functions performed by components of system 200 are associated with one or more applications, services, or routines. In one embodiment, certain applications, services, or routines may operate on one or more user devices (such as user device 102a), servers (such as server 106), may be distributed across one or more user devices and servers, or may be implemented in a cloud-based system. Moreover, in some embodiments, these components of system 200 may be distributed across a network, including one or more servers (such as server 106) and client devices (such as user device 102a), in the cloud, or may reside on a user device (such as user device 102a). Moreover, these components, functions performed by these components, or services carried out by these components may be implemented at appropriate abstraction layer(s) such as the operating system layer, application layer, hardware layer, and so forth, of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and so forth. Additionally, although functionality is described herein with reference to specific components shown in example system 200, it is contemplated that in some embodiments functionality of these components can be shared or distributed across other components.

Continuing with FIG. 2, application metric collection component 210 is generally responsible for accessing, receiving, and determining information associated with applications, such as which applications have been accessed or are running on a device, such as the user device 102a of FIG. 1 or the server 106 of FIG. 1. Application metric data 232 generally refers to any type of data that is related to or can be associated with an application. In some instances, the application metric data 232 may correspond to an occurrence associated with an application at a moment in time. For example, application metric data 232 may include an indication of content provided by the application, a time of access for the application, computational resources utilized by the application, an indication of inputs being requested by the application, and so forth. As such, application metric data 232 may include any suitable data indicative of: (1) application usage; (2) which particular applications are in use, remain open, and/or are requesting a user input; and (3) so forth. Application metric data 232 may include an indication of whether a particular application is a pinned application or an unpinned application, as discussed herein. Application metric data 232 can be obtained from one or more data sources, such as data sources 104an and 104b through 104n of FIG. 1. Additionally or alternatively, application metric data 232 may be stored in the storage 230 for later access by the overflow engine 220 to arrange the overflow application indicators based at least on respective application metric data 232, as discussed herein.

In some embodiments, application metric collection component 210 may be employed to facilitate the accumulation of application metric data 232 associated with a plurality of application running on a particular device, or in some cases, a plurality of applications running on two or more associated devices, such as a tablet device communicatively coupled to or associated with a laptop device. The application metric data 232 may be received or accessed, and optionally accumulated, reformatted and/or combined, by application metric collection component 210 and stored in one or more data stores such as storage 230, where it may be available to the components or subcomponents of system 200. For example, the application metric data 232 may be associated with a corresponding application, as described herein. Furthermore, the application metric data 232 may be used to classify the application (by the overflow application classifier 222) as a pinned application or an unpinned application, as described below.

Application metric data 232 may be obtained in response to any number of events indicative of actions taken on a computing device, such as the user device 102a of FIG. 1 and/or the server 106 of FIG. 1. The application metric data 232 may then be stored in storage 230 and associated to a corresponding application. For example, in some embodiments, application metric data 232 may be obtained via application metric collection component 210 based on a user interacting with (e.g., selecting, touching, hover over, and/or so forth) an application or an application indicator. A user interaction with an application indicator may include a click, touch, hovering over, and/or any other suitable operation for selecting or opening an application, for example, from a data source 104a on a user device 102a. As such, it should be understood that a user interaction with an application includes any suitable input used to access any feature or aspect of a particular application. For example, a user interaction may include a selection (e.g., touch input on a tablet device) of an application presented on the display 103a of FIG. 1. In one embodiment, selection of an application indicator causes a window of the corresponding application to be presented on the display 103a of FIG. 1.

Application metric data 232 may be any type of data associated with an application, such as a time at which the application was least most recently opened or accessed, a request for a user input, a status indicating whether the application is in use or closed (for example, as determined based on the computational resources being utilized by an application), and so forth. By way of example and not limitation, application metric data 232 may include data that is determined based on a user device 102a from FIG. 1 or server 106 of FIG. 1 running an application. For example, the application metric collection component 210 may collect computing device information (such as charging data, date/time, or other information derived from a computing device), user-activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events; other user interactions with a user device, and so forth) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other data that may be sensed or otherwise detected, data derived based on other data (for example, location data that can be derived from Wi-Fi, cellular network, or IP (internet protocol) address data), calendar items specified in user's electronic calendar, and nearly any other source of data that may be sensed or determined as described herein.

Continuing with FIG. 2, the presentation component 212 is configured to generate a GUI and related content, for example, on the display 103a of the user device 102a of FIG. 1. The presentation component 212 may generate the GUI based on an operating mode or orientation of the computing device. For example, the presentation component 212 may receive sensor data indicating that a computing device, such as the user device 102a of FIG. 1, is oriented in a tablet mode. Orientation in the tablet mode may correspond to the computing device being oriented relative to a gravity vector such that a width of the display screen is greater than a height of the display screen. In response to determining that the user device 102a is oriented in a tablet mode, the presentation component 212 may generate a landscape view of the GUI. As another example, the presentation component 212 may receive sensor data indicating that a computing device, such as the user device 102a of FIG. 1, is oriented in a desktop mode. Orientation in the desktop mode may correspond to the computing device being oriented relative to a gravity vector such that a height of the display screen is greater than a width of the display screen. In response to determining that the user device 102a is oriented in a desktop mode, the presentation component 212 may generate a portrait view of the GUI. The landscape view may be a version of the portrait view that has been rotated 90 degrees. Similarly, the portrait view may be a version of the landscape view that has been rotated 90 degrees.

In either case, the presentation component 212 may locate a task bar in any suitable position on the GUI. In one embodiment, the presentation component 212 generates a task bar that is located at the bottom of the screen. For example, when presenting content in the tablet mode, the presentation component 212 may locate the task bar along the bottom width (which is less than the height). As another example, when presenting content in the desktop mode, the presentation component 212 may locate the task bar along the bottom width (which is greater than the height). While the example provided here discussed a task bar positioned along the bottom of the GUI, it should be understood that the task bar may be positioned at any suitable location on the GUI to occupy any region on the GUI. In one embodiment, a user may navigate to taskbar settings to customize the position of the task bar (e.g., to position the task bar toward the right, the left, the top, or bottom). In one embodiment, the task bar may be positioned in accordance with a default position configuration, which may be changed, for example, based on a software update, user interactions with the GUI, and the like.

The task bar may include any number of application indicators associated to the task bar. For example, the presentation component 212 may determine that certain applications have been pinned to the task bar (e.g., by a user), such that only indicators corresponding to the pinned applications are located on the task bar, and indicators corresponding to overflow or unpinned applications are not included on the task bar. Instead, indicators corresponding to overflow or unpinned applications may be presented through the overflow tool, as discussed herein. As used herein, pinned application refers to any application that has been specially designated or categorized to have a corresponding selectable indicator included on the task bar by the presentation component 212. The pinned applications may be manually or automatically associated with any suitable designation or category indicating that the pinned application indicator is to be included on the task bar. For example, the pinned applications may be favorited such that only indicators corresponding to favorited applications are displayed on the task bar and indicators corresponding to non-favorited applications are displayed on the overflow tool, as discussed herein.

Continuing with FIG. 2, the overflow engine 220 is generally configured to provide an overflow tool that improves application accessibility for application indicators that do not fit on a task bar, that are not pinned to the task bar, and/or that are not associated with the task bar, which are herein referred to as overflow application indicators. Overflow engine 220 may include an overflow application identifier 222 configured to determine which applications are classified as overflow applications, an overflow application sequencer 224 configured to assign order to the overflow application indicators displayed on the overflow panel of the overflow tool, and an overflow tool provider 226 configured to generate an overflow tool, as described herein.

The overflow application classifier 222 may determine whether an application is an overflow application based on the application metric data 232 determined by the application metric collection component 210 and/or stored in storage 230. In certain embodiments, the presentation component 212 is configured to generate the pinned application indicators that are displayed on the task bar and the overflow application indicators that are displayed on the overflow tool, as discussed herein.

In certain embodiments, the overflow application classifier 222 may determine an available space on the task bar (i.e., an area or region configured to present application indicators on the taskbar, but which does not presently include application indicators) and determine a number of overflow applications that are in use. Based on an available space on the task bar, the overflow application classifier 222 may determine a threshold number of additional application indicators that can fit on the task bar. In response to the number of overflow applications in use exceeding the threshold number of additional application indicators, the overflow application classifier 222 may assign the overflow applications to the overflow panel. Alternatively, in response to the number of overflow applications in use exceeding the threshold number of additional application indicators, the overflow application classifier 222 may assign to the task bar a number of overflow applications equal to or less than the threshold number of additional application indicators and assign to the overflow panel the overflow applications greater than the threshold number of additional application indicators.

Continuing with FIG. 2, the overflow application sequencer 224 is configured to arrange the overflow applications in a particular arrangement on the overflow panel. In some embodiments, the overflow application sequencer 224 may determine and assign an order to the overflow applications. The overflow application sequencer 224 may determine an order or arrangement for the overflow applications based on the application metric data 232 described above. The order or arrangement for the overflow applications may be based on a recency of use for the overflow applications. For example, after an application has been classified as an overflow application (by the overflow application classifier 222), the overflow application sequencer 224 may determine or obtain (from the storage 230) a timestamp associated with an interaction with each overflow application. The timestamp may include a time at which the corresponding overflow application was opened, closed, or last interacted with.

In some embodiments, the most recently used overflow application may be assigned a first position for the arrangement on the overflow panel and the least most recently used overflow application may be assigned a last position for the arrangement on the overflow panel. Alternatively, in an embodiment, the most recently minimized (but still open and running) overflow application may be ordered first and the overflow application that was minimized the longest time ago may be ordered last. In this manner, the overflow application sequencer 224 may arrange the overflow applications from first to last based on a timestamp associated with when a user interacted with (e.g., opened, minimized, and/or closed) the overflow applications.

In certain embodiments, the overflow application sequencer 224 may receive an indication of when an overflow application was interacted with. In response to receiving this indication, the indicator for the interacted-with overflow application may be repositioned to be arranged toward the front of the order of overflow applications. In this manner, the order associated with the overflow applications and the arrangement of their corresponding indicators is dynamically updated in response to a user interaction with an overflow application.

Continuing with FIG. 2, the overflow tool provider 226 may generate the overflow tool, which may include a most recently used (MRU) slot, an overflow selection indicator, the overflow panel, and an extender user interface element, as described below with respect to FIGS. 4-11. In certain embodiments, the MRU slot and the overflow selection indicator may be displayed collinearly with respect to the task bar and the pinned application indicator(s) positioned on the task bar. The overflow tool provider 226 may display in the MRU slot the indicator for the first overflow application in the order of overflow applications. As such, the overflow tool provider 226 may replace the overflow application indicator displayed in the MRU slot based on a change in order determined by the overflow application sequencer 224. In one embodiment, the overflow application currently open and being used by a user may correspond to the overflow application indicator occupying the MRU slot. Alternatively, in one embodiment, the indicator for most recently used overflow application other than the application that the user is currently interacting with may be displayed in the MRU slot. By presenting the most recently used overflow application indicator in the MRU slot, the overflow tool provider 226 facilitates access to the overflow application that was least most recently accessed, especially when this overflow application indicator is not otherwise readily accessible on the task bar, for example, based on the overflow application not being a pinned application.

The overflow tool provider 226 may generate the overflow panel in response to certain trigger events. For example, in response to receiving an indication of a first user interaction (such as a selection input, hovering over input, a voice command, or touch input) with the overflow selection indicator, the overflow tool provider 226 may generate the overflow panel including an ordered arrangement of indicators for the most recently used overflow application as described below with respect to FIGS. 4-6 and 13. The overflow panel may include a collinear listing of indicators for overflow applications that is oriented parallel, perpendicular, or in any other suitable arrangement with respect to the pinned application indicators on the task bar. In some embodiments, the overflow panel may be displayed above the task bar and along the right or left regions of the GUI to facilitate access to the overflow applications. By displaying the overflow panel proximate to the task bar along the right or left regions of the GUI, the overflow tool may facilitate thumb access to the overflow application indicators, for example, when the computing device is in tablet mode, because the overflow application indicators may be within thumb reach.

As previously described, in some cases, the order for displaying the overflow application indicators can be determined, obtained, or derived. As such, overflow application logic 235 may be utilized for determining and assigning an order to the overflow application indicators, and the like. Overflow application logic 235 may include rules, conditions, associations, classification models, or other criteria to determine an order for displaying the overflow application indicators on the overflow panel. For example, in one embodiment, overflow application logic 235 may include comparing a time at which different overflow applications were opened to determine that the indicator for the most recently opened overflow application that should be moved to the front of the order of overflow application indicators. The overflow application logic 235 can take many different forms depending on the mechanism used to determine the order of the overflow applications. For example, the overflow application logic 235 may comprise training data used to train a neural network that is used to evaluate application metric data 232 (e.g., received via the application metric collection component 210) to determine an order for any number of overflow application indicators. The overflow application logic 235 may comprise static rules (which may be predefined or may be set based on settings or preferences in a preferred order of the overflow application indicators), Boolean logic, fuzzy logic, neural network, finite state machine, support vector machine, logistic regression, clustering, or machine learning techniques, similar statistical classification processes, other rules, conditions, associations, or combinations of these to rearrange an order for presenting the overflow application indicators on the overflow panel. For instance, the overflow application logic 235 may specify types of user interaction(s) information that are associated with an event triggering for the rearrangement of the order for presenting the overflow applications, such as an overflow application being launched, an overflow application closing, an overflow application being accessed at frequency exceeding a threshold value, a priority level of an overflow application, or the like.

As shown, example system 200 includes a presentation component 212 that is generally responsible for presenting content and related information, such as the overflow tool, to a user. Presentation component 212 may comprise one or more applications or services on a user device, across multiple user devices, or in the cloud. For example, in one embodiment, presentation component 212 manages the presentation of content to a user across multiple user devices associated with that user. In some embodiments, presentation component 212 may determine in what format content it is presented. In some embodiments, presentation component 212 generates user interface features, as described herein. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In certain embodiments, the presentation component 212 may generate the GUI based on whether the computing device is operating in a tablet mode or desktop mode, as discussed herein.

As shown, the presentation component 212 includes an overflow tool positioner 240 configured to calculate a position of the overflow panel on the GUI. After the overflow applications have been identified and ordered, the presentation component may determine the position on the screen in which the overflow panel will be positioned to present the overflow application indicators. In one embodiment, the overflow application indicators are presented after the pinned application indicators on the task bar and offset from the task bar via an overflow panel separate from the task bar, as discussed herein. Generation of the overflow panel may be based on whether the computing device is in the desktop mode or the tablet mode.

The overflow panel may be programmed into the computing device as an extension of the task bar, such that the overflow tool positioner 240 calculates a distance offset from the task bar to display the overflow panel. For example, in one embodiment, the overflow tool positioner calculates x and y coordinates by which the overflow panel will be displayed offset relative to the task bar. In one embodiment, the overflow tool positioner 240 calculates a distance offset relative to the end of the task bar to which a center or beginning of the overflow panel will be displayed. The overflow tool positioner 240 generates the overflow panel so that the overflow application indicators are placed after or proximate to the pinned application indicators of the task bar, but the coordinate space of the overflow panel is offset from that of the task bar. In this manner, computational efficiency may be improved since existing layouts and designs of the GUI may be leveraged in displaying the overflow panel, which in certain embodiments, may be an extension of the task bar.

Figure 3:
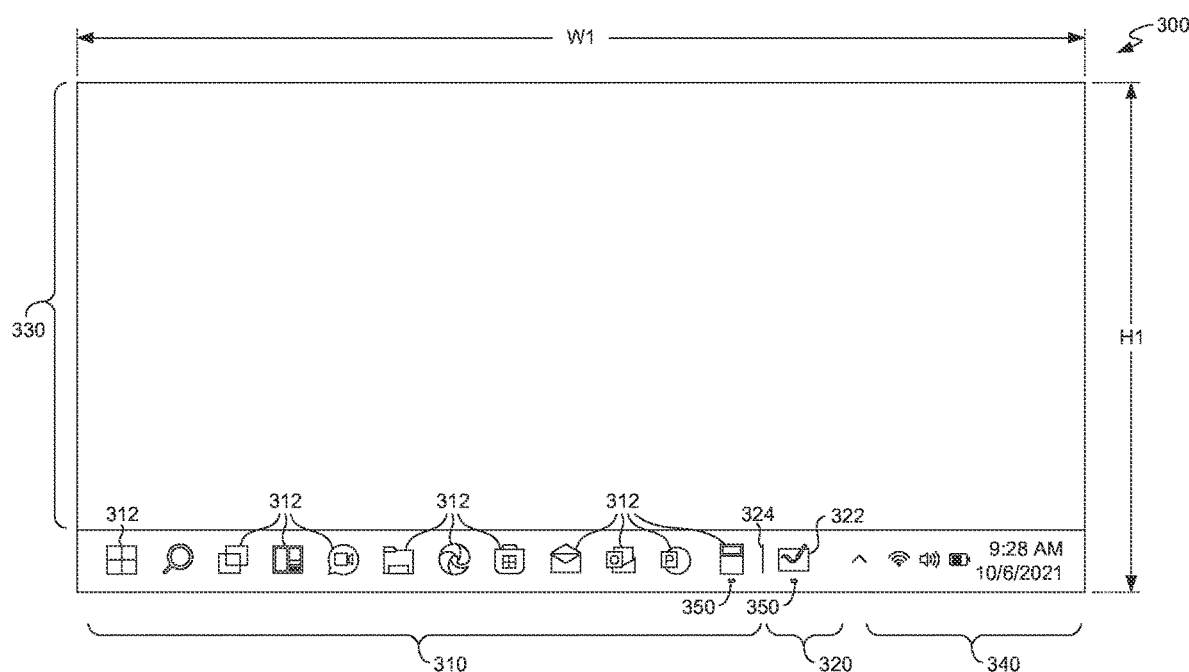
FIG. 3 is a screenshot of an example graphical user interface (GUI) that illustrates a task bar and most recently used slot, according to some embodiments of this disclosure.

Turning to FIG. 3, illustrated is a screenshot of an example graphical user interface 300 that illustrates a task bar 310 including pinned application indicators 312, and the MRU slot 320 including a most recently used overflow application indicator 322, according to some embodiments of this disclosure. The GUI 300 may be generated by any suitable device, such as the user device 102*a* of FIG. 1, as well as the server 106 of FIG. 1. To facilitate distinguishing the pinned application indicators 312 of the task bar 310 from the most recently used overflow application indicator 322 of the MRU slot 320, the GUI 300 may include a divider 324 dividing the task bar 310 from the MRU slot 320.

In certain embodiments, the task bar 310 is positioned along a border of the display, in this example, toward the bottom border of the display. Similarly, the MRU slot 320 may be positioned along a border of the display, in this example, toward the bottom of the display. In certain embodiments, the task bar 310 and the MRU slot 320 may be positioned along the same border, such that the MRU slot 320 is positioned collinearly with respect to the task bar 310. Alternatively, the task bar 310 and the MRU slot 320 may be presented along different borders. As illustrated, the GUI may also include a work region 330, which may occupy a greater display area as compared to the task bar 310 and MRU slot 320. In some embodiments, selection of a pinned application indicator 312 or an overflow application indicator 322 may cause content corresponding to the selected application indicator to be presented on the entirety of the work region 330 or a portion of the work region 330. It should be understood that any number or combination of pinned application indicators 312 and/or overflow application indicator(s) 322 may be used or running at the same time, such that their corresponding content may be presented or stacked on the work region 330. In an embodiment, presentation of content associated with an application may be restricted to the work region 330, such that an application may not cover any portion of the task bar 310, the MRU slot 320, and/or widgets tool bar 340. The widgets tool bar 340 may include indicators corresponding to various functional widgets, such as a clock, date, battery life, signal strength, volume, and the like.

Figure 5:
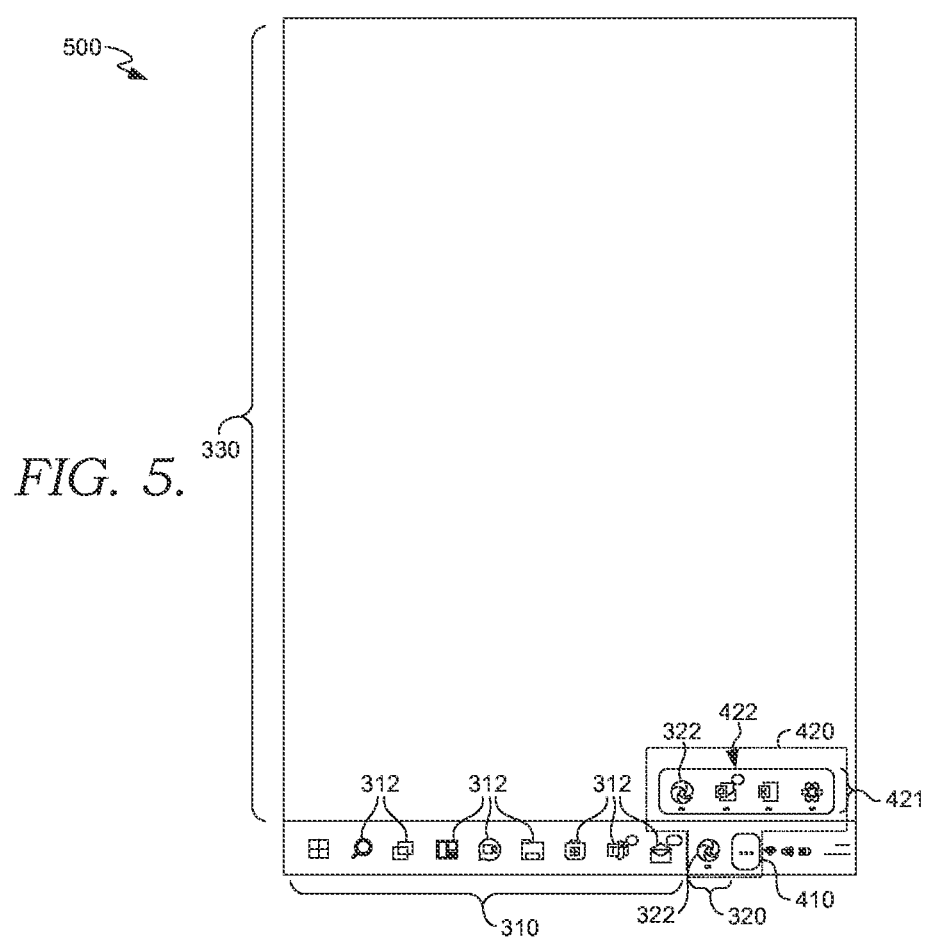
FIG. 5 is an example tablet GUI that illustrates the task bar of FIG. 3 and the overflow tool of FIG. 4, according to some embodiments of this disclosure.
Figure 7:
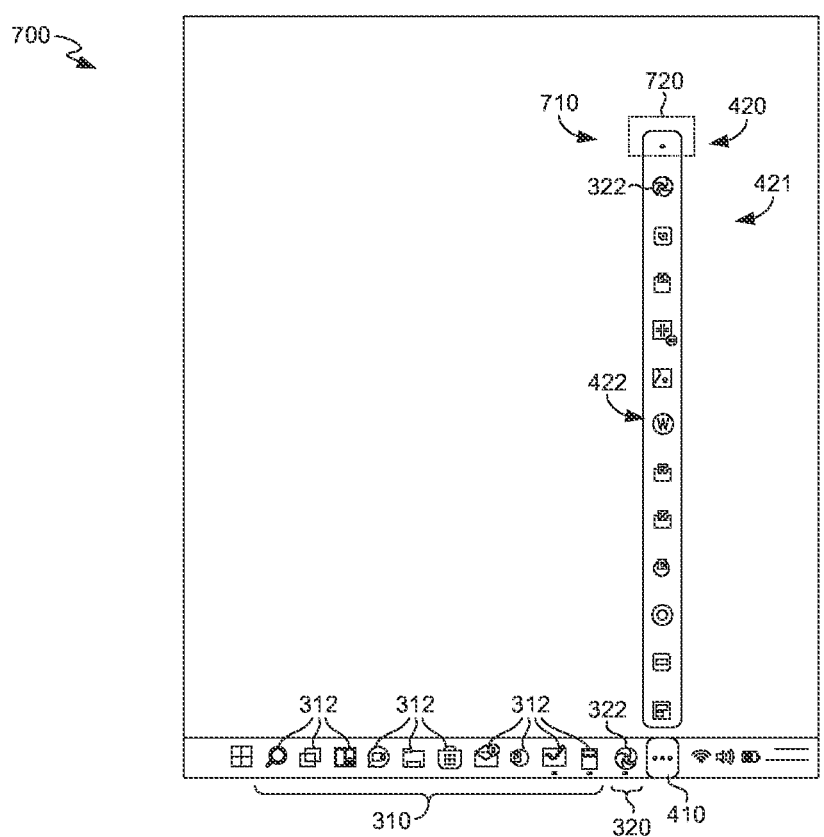
FIG. 7 is an example tablet GUI that illustrates the overflow tool of FIG. 4 that is configured to generate a vertical arrangement of the overflow panel, according to some embodiments of this disclosure.
Figure 8:
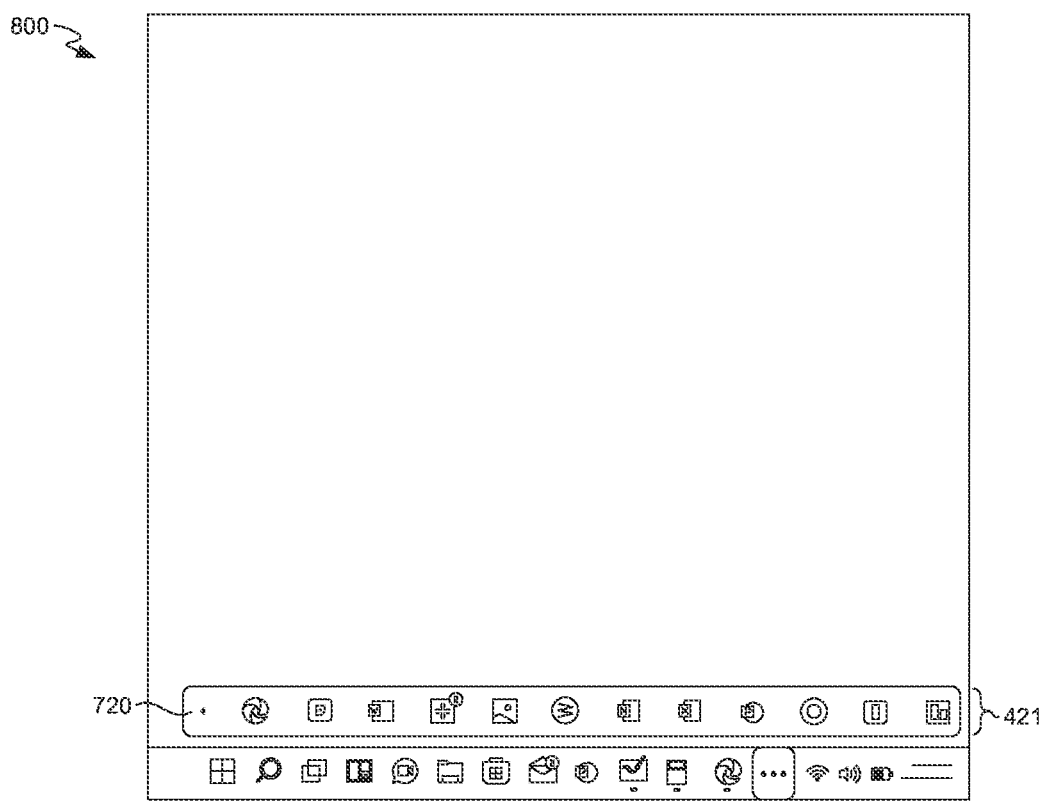
FIG. 8 is an example GUI that illustrates a panel size adjuster configured to adjust a size of the overflow panel, according to some embodiments of the disclosure.

As discussed above, the presentation component 212 of FIG. 2 may generate various aspects of the GUI. In the illustrated embodiment, the presentation component 212 may generate the GUI and the various features based on the GUI being presented in the desktop mode. While the example GUI 300 is presented in a desktop mode, such that the width, W1, is greater than the height, H1, of the display surface; it should be understood that the GUI may also be presented in the tablet mode such that the width is less than the height of the display surface, as illustrated in FIGS. 5, 7, and 8. In addition, the presentation component 212 of FIG. 2 may locate the application indicators for display on the task bar 310 and/or the MRU slot 320 with any suitable indicators. For example, as illustrated, the application indicators on the task bar 310 and/or the MRU slot 320 may include a status indicator 350 configured to provide a visual indication to visually notify a user that the corresponding application indicator is currently running in an active and/or suspended state. Therefore, in certain embodiments, the status indicator 350 may be omitted from the indicators corresponding to the applications that have not been launched and/or are not running on the computing device. While in the illustrated example, the status indicator 350 includes a marking, such as a bar or line, below the application indicator for which the status indicator 350 is providing an indication, it should be understood that the status indicator 350 may be a highlight, change in color, symbol, or any other suitable visualization.

Continuing with FIG. 3, the MRU slot 320 may include an overflow application indicator 322 corresponding to the most recently used overflow application. The MRU slot 320 may exclude the pinned application indicators 312, since those pinned application indicators are already readily accessible via the task bar 310. In one embodiment, the MRU slot 320 is configured to present one application indicator, but the MRU slot may also be configured to present any number of ordered overflow application indicators that have been ordered, for example, based on the overflow application sequencer 224 of FIG. 2. As discussed above, the overflow application sequencer 224 may determine an order of the overflow application indicators based on application metric data (e.g., the application metric data 232 of FIG. 2).

For the case in which the MRU slot 320 is configured to present one overflow application indicator, the MRU slot 320 may display an indicator corresponding to the most recently used overflow application. The most recently used overflow application indicator 322 may correspond to the overflow application that was least most recently presented on the work region 330 or otherwise launched, and that is still open. In one embodiment, an overflow application that is currently running or displayed on the work region 330 is omitted from the determination of the most recently used overflow application indicator 322. As such, the MRU slot 320 may present the most recently used overflow application indicator other than an indicator for an overflow application currently running on the computing device presenting the GUI 300.

For the case in which the MRU slot 320 is configured to present more than one overflow application indicator, the MRU slot 320 may display indicators corresponding to the most recently used overflow applications ordered from (1) most recently used to (2) used the longest time ago. The most recently used overflow application indicator 322 may correspond to the overflow application that was least most recently presented on the work region 330 or otherwise launched, and that is still open. In one embodiment, an overflow application that is currently running or displayed on the work region 330 is omitted from the determination of the most recently used overflow application indicators 322 presented on the MRU slot 320. As such, the MRU slot 320 may present more than one of the most recently used overflow application indicators other than the indicator for the overflow application currently running. In one embodiment, the overflow application that is currently running or displayed on the work region 330 is factored into the determination of the most recently used overflow application indicators 322 presented on the MRU slot.

Figure 4:
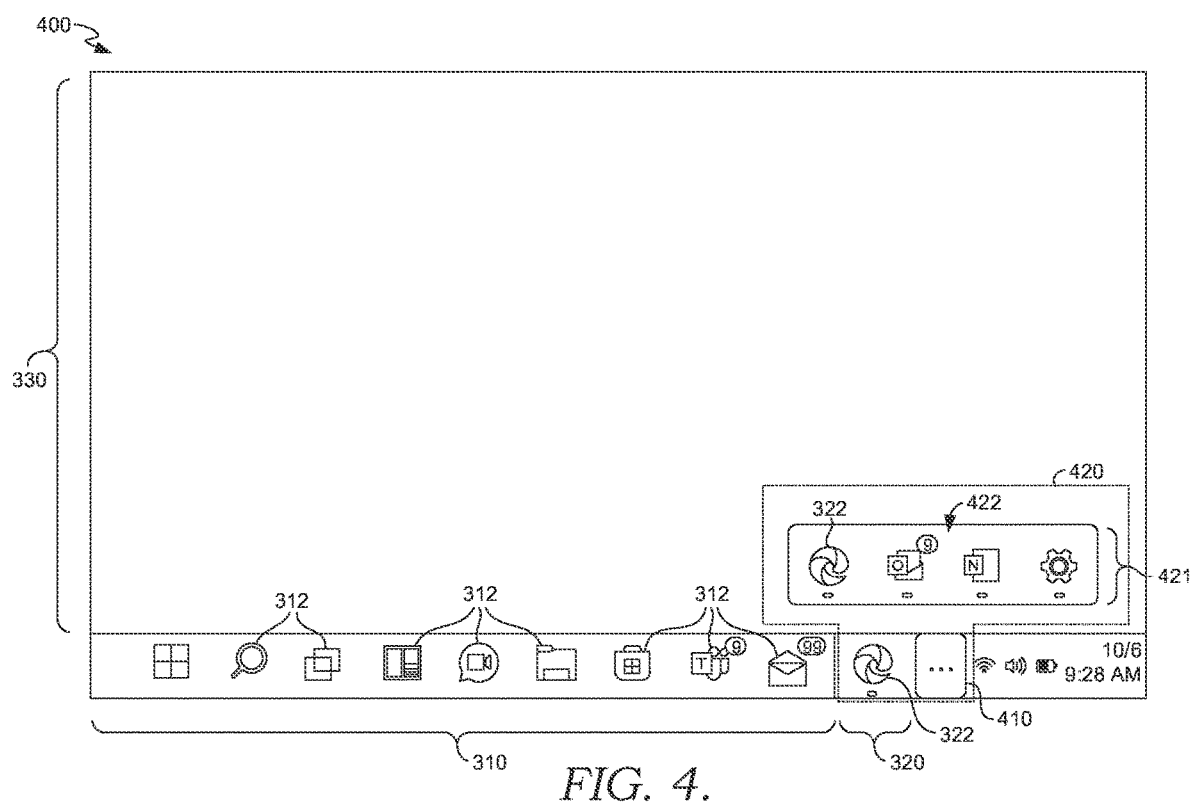
FIG. 4 is a screenshot of an example desktop GUI that illustrates the task bar of FIG. 3 and an overflow tool, which includes a most recently used slot, and an overflow selection indicator that when interacted with generates an overflow panel, according to some embodiments of this disclosure.
Figure 6:
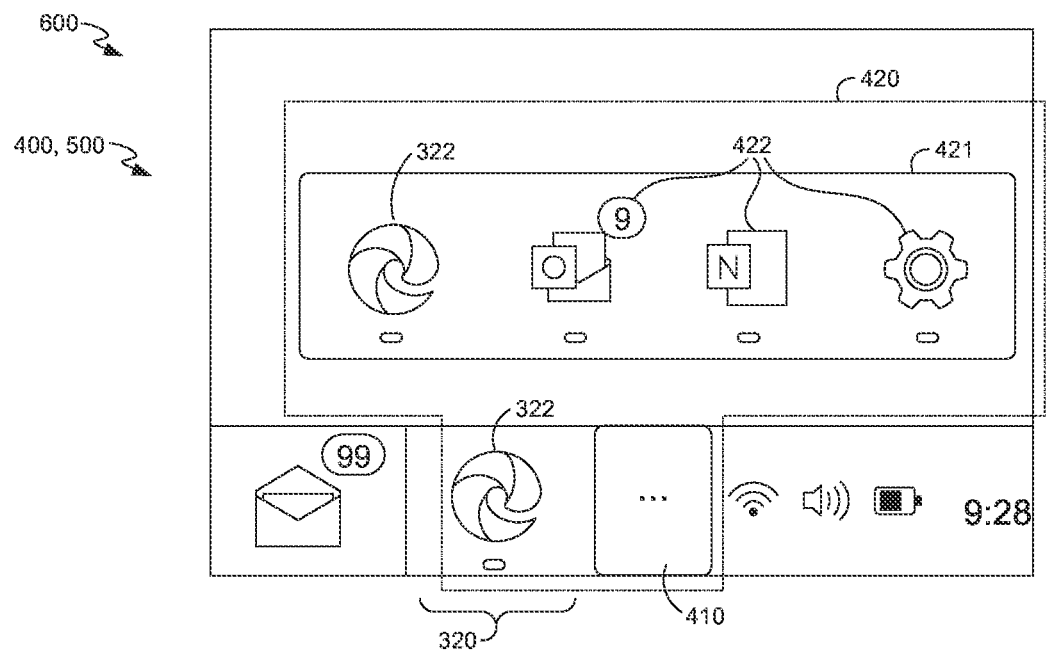
FIG. 6 is a zoomed-in screenshot of a portion of the desktop GUI of FIG. 4 or the tablet GUI of FIG. 5 that illustrates the task bar of FIG. 3 and the overflow tool of FIG. 4, according to some embodiments of this disclosure.

Turning to FIG. 4 and to facilitate discussion, the overflow expansion control 410, the overflow panel 421, and their corresponding features will be collectively referred to as the overflow tool 420. Turning to FIGS. 4-6, which will be discussed together, FIG. 4 is a screenshot of an example desktop GUI 400 that illustrates the task bar 310 and an overflow tool 420, which includes the MRU slot 320 and an overflow expansion control 410 that when interacted with generates an overflow panel 421, according to some embodiments of this disclosure. As compared with FIG. 3, the example GUI 400 of FIG. 4 differs in that it includes the overflow expansion control 410, the overflow panel 421, and an ordered listing of overflow application indicators 422. As compared with FIG. 4, FIG. 5 is an example tablet GUI 500 (instead of a desktop GUI 400 of FIG. 4). FIG. 6 is a zoomed-in screenshot of a portion 600 of the desktop GUI 400 of FIG. 4 or the tablet GUI 500 of FIG. 5.

As set forth above, to improve the user experience by providing a tool for more easily accessing application indicators that are not pinned to the task bar, the overflow tool 420 provides a mechanism (e.g., the MRU slot 320) for viewing and selecting the most recently used overflow application indicator 322; a mechanism (e.g., the overflow expansion control 410) for viewing a dynamically updated listing of overflow application indicators; and a mechanism (e.g., the overflow panel 421) for selecting one of the overflow application indicators 422 in the ordered listing. In some embodiments, the ordered listing may be dynamically ordered, such that the ordered listing is updated based on any event, such as a user toggling between overflow applications.

As described above, the overflow engine 220 of FIG. 2 may generate the overflow tool 420. In some embodiments, the overflow panel 421 may be generated in response to a user interaction (such as a selection input, a voice command, hovering over input, or touch input) with the overflow expansion control 410. The overflow panel 421 may be displayed above the task bar 310 and along the right portion of the GUI. As illustrated, the overflow panel 421 includes a dynamically updated listing of overflow application indicators 422 that are chronologically organized based on which overflow applications were most recently used. The overflow panel 421 may list the overflow application indicators 422 along a row. For example, as illustrated, the overflow panel 421 may present application indicators horizontally from left to right with the indicator for the most recently used application on one end, such as the far left end, and the indicator for the least most recently used application on the other end, such as the far right end. Alternatively, the overflow panel may present applications vertically from down-up with the most recently used application on one end, such as the top end, and the least most recently used application on the other end, such as the bottom end.

To that end, FIG. 7 is an example tablet GUI 700 that illustrates the overflow tool of FIG. 4 that is configured to be displayed a vertical arrangement 710 of the overflow panel 421, according to some embodiments of this disclosure. While the illustrated example includes the vertical arrangement 710 of the overflow panel 421 on the tablet GUI 700, it should be understood that the overflow panel 421 may be displayed in the vertical arrangement 710 in the desktop view (e.g., GUI 400 of FIG. 4) or any other suitable view. As illustrated, the overflow panel 421 in the vertical arrangement may include the overflow application indicators 422 arranged along an axis that is perpendicular to the axis along which the pinned application indicators 312 on the task bar 310 are arranged. By being vertically arranged, the overflow applications may be proximate to a user's thumb, thereby enhancing the ease of access of the application. It should be understood that the axis along which the overflow application indicators 422 are arranged may be at any suitable angle with respect to the axis along which the pinned application indicators 312 on the task bar 310 are arranged. For example, the axis along which the overflow application indicators 422 are arranged may intersect the axis along which the pinned application indicators 312 on the task bar 310 are arranged at an angle other than 90 degrees or at 90 degrees.

In accordance with the disclosed embodiments, by arranging the overflow application indicators 422 along a different axis from which the pinned application indicators 312 on the task bar 310 are arranged, the GUI may facilitate distinguishing the pinned applications from the overflow applications.

In some embodiments, the overflow panel 421 includes a panel size adjuster 720. The panel size adjuster 720 may be displayed toward one or more ends of the overflow panel, such has the top and/or bottom ends or portions of the overflow panel 421. In response to selection of the panel size adjuster 720, the overflow panel 421 may increase in size to accommodate more overflow application indicators 422. Selection of the panel size adjuster 720 may cause the overflow panel 421 to increase in height or width to accommodate additional rows or columns of overflow application indicators. In some embodiments, the panel size adjuster 720 (or any other suitable control, such as arrows, scroll tabs, and the like), when selected, may allow a user to scroll to other overflow application indicators 422 that do not fit in the overflow panel 421.

To provide another example of a panel size adjuster, FIG. 8 is an example GUI 800 that illustrates a panel size adjuster 720 configured to adjust a size of the overflow panel 421, according to some embodiments of the disclosure. As illustrated, when the panel size adjuster 720 is selected, the overflow panel 421 may increase in size along the axis along which the overflow application indicators 422 are arranged. In this example, the overflow panel 421 expands horizontally, but it should be understood that the overflow panel 421 may be configured to expand along any direction to increase the number of overflow application indicators 422 displayed on the overflow panel 421.

Figure 9:
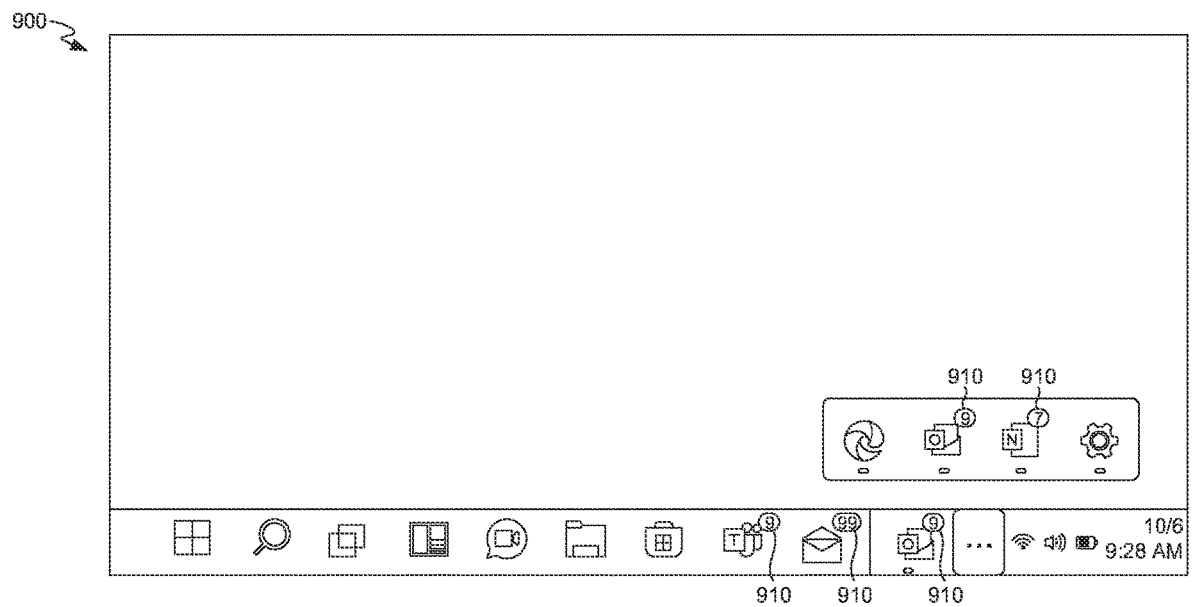
FIG. 9 is an example GUI that illustrates badges on certain application indicators of the task bar of FIG. 3 and the overflow tool of FIG. 4, according to some embodiments of this disclosure.

Turning to FIG. 9, depicted is an example GUI 900 that illustrates badges 910 on certain application indicators of the task bar of FIG. 3 and the overflow tool of FIG. 4, according to some embodiments of this disclosure. As set forth above, the GUI may include any number of additional functional features. In some embodiments, the overflow tool 420 includes badges 910 indicating a number of notifications associated with a particular application. The badges 910 may be displayed on a pinned application indicator 312 or overflow application indicator 422. In certain embodiments, the badges 910 may be presented as a numerical indication (e.g., bubble) on an application indicator corresponding to an application having any number of notifications. For example, as illustrated, certain application indicators include badges 910 with a number, such as "7", "9", and "99" to indicate that the corresponding applications current have seven, nine, and ninety-nine notifications, respectively. While in the illustrated embodiment the badges 910 include numbers in text bubbles, it should be understood that the badges 910 may visually communicate any information indicative of notifications associated with an application via any suitable mechanism.

Figure 10:
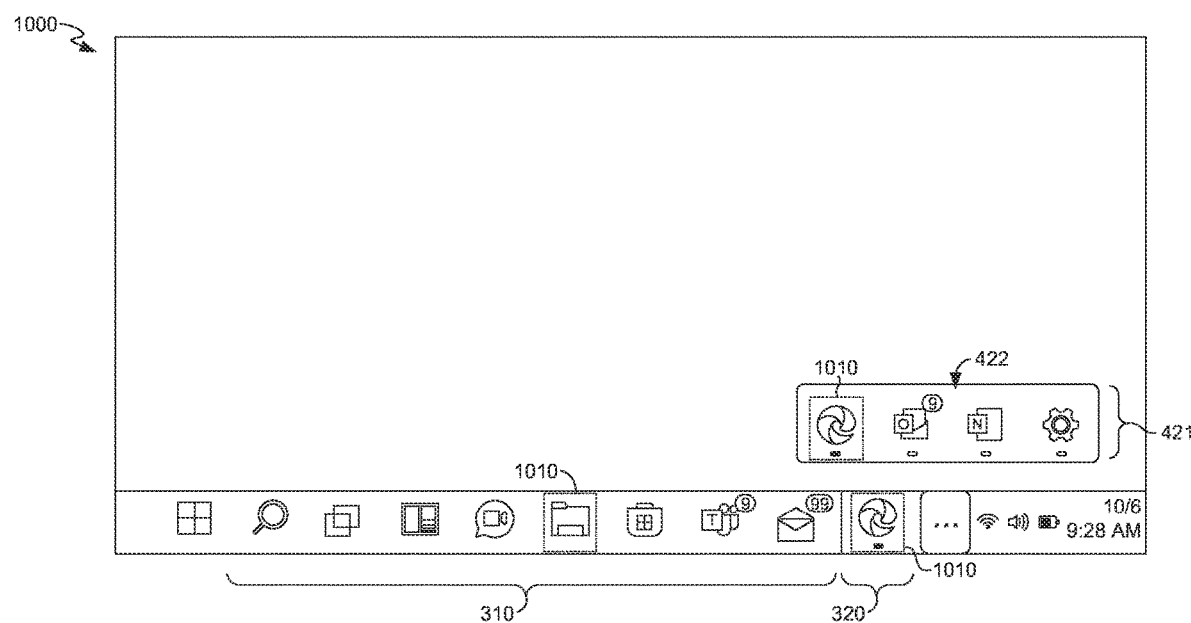
FIG. 10 is an example GUI that illustrates an emphasis notification on certain application indicators of the task bar of FIG. 3 and the overflow tool of FIG. 4, according to some embodiments of this disclosure.

Turning to FIG. 10, depicted is an example GUI 1000 that illustrates an emphasis notification 1010 on certain application indicators of the task bar 310 of FIG. 3 and the overflow tool 420 of FIG. 4, according to some embodiments of this disclosure. The emphasis notifications 1010 may serve as a visual indication that the corresponding application is waiting for a particular user input. For example, in one embodiment, the emphasis notification 1010 may be generated to indicate that the corresponding application is awaiting a deletion or selection. Alternatively or in addition, the emphasis notification 1010 may indicate that a session associated with the corresponding application is about to expire in any amount of time, such as one minutes or five minutes, for example. While emphasis notification is depicted as a dashed/dotted line, it should be understood that the emphasis notification 1010 may be generated using any suitable distinguishing visual indication such as a highlight, a flashing color, and the like.

Figure 11:
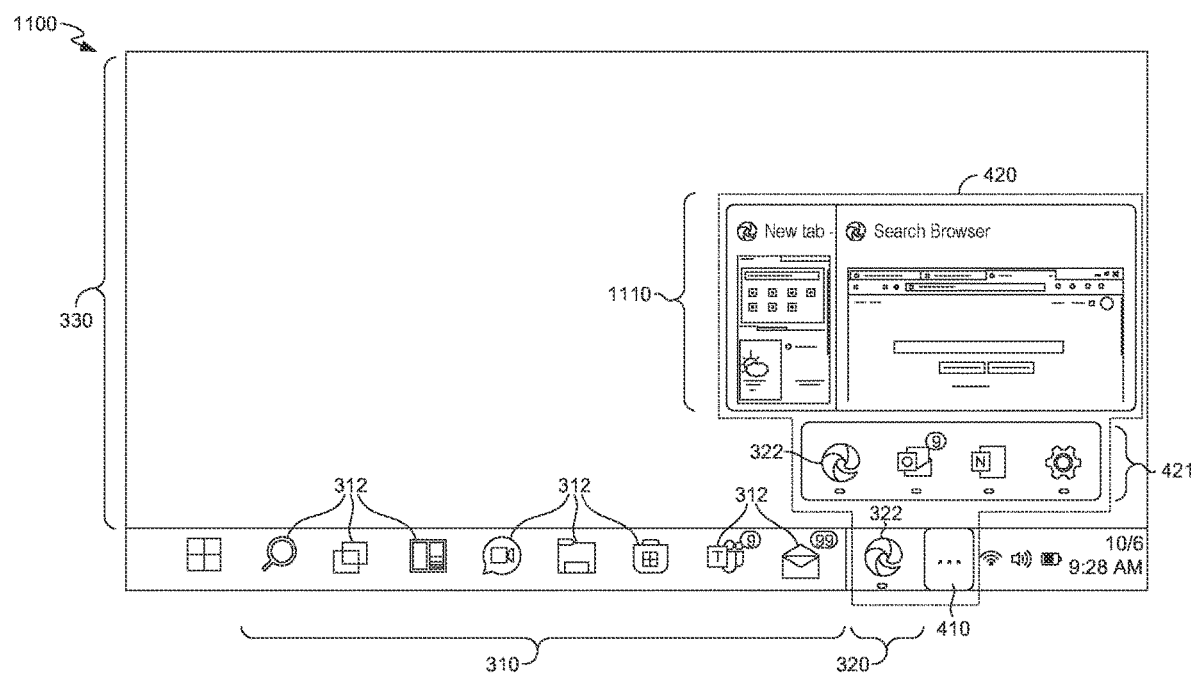
FIG. 11 is an example GUI that illustrates the task bar of FIG. 3 and the overflow tool of FIG. 4, which includes an extended user interface element, according to some embodiments of this disclosure.

FIG. 11 is an example GUI 1100 that illustrates the task bar 310 of FIG. 3 and the overflow tool 420 of FIG. 4, which includes an extended user interface element 1110, according to some embodiments of this disclosure. As illustrated, the extended user interface element 1110 may be displayed in response to a user interaction with a respective overflow application indicator 422 of the overflow panel 421. In this example, in response to receipt of an indication indicative of a user interaction with the indicator 322 corresponding to the most recently used application on the overflow panel 421, the extended user interface element 1110 may be displayed on the work region 330. As discussed above, the overflow tool provider 226 of FIG. 2 may generate the extended user interface element 1110.

As set forth above, in some embodiments, the overflow tool 420 provides a mechanism (e.g., the MRU slot 320) for viewing and selecting the most recently used overflow application indicator 322; a mechanism (e.g., the overflow expansion control 410) for viewing an ordered listing of overflow application indicators; a mechanism (e.g., the overflow panel 421) for selecting one of the overflow application indicators 422 in the ordered listing; and a mechanism (e.g., the extended user interface element 1110) for previewing a particular overflow application corresponding to the overflow application indicators 422 in the overflow panel 421. In some embodiments, the extended user interface element 1110 provides a preview window that depicts a visual representation, which may be in near real-time, of the overflow application corresponding to the interacted indicator from the overflow panel 421. In this manner, the GUI 1100 may provide a user a preview of an application without causing the application to be maximized or otherwise more fully displayed and thus occupy more space on the work region 330. Indeed, in some embodiments, the extended user interface element 1110 may occupy a smaller portion on the work region 330 than if the corresponding application was launched or opened.

Figure 12:
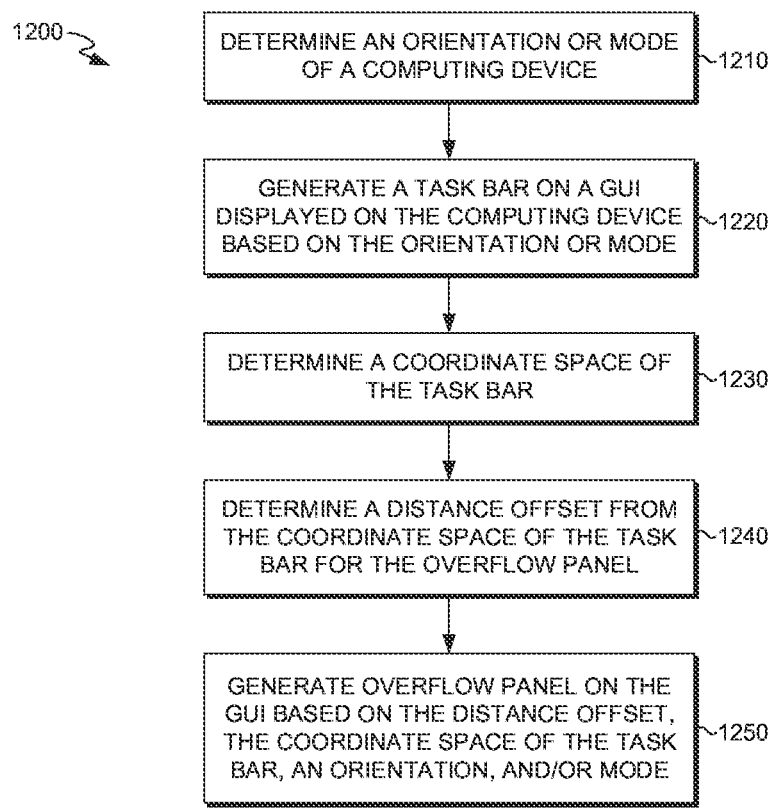
FIG. 12 is a flow diagram of an example process for generating the overflow panel of FIGS. 4-11 based at least on a distance offset relative to the task bar, according to some embodiments of this disclosure.

Turning now to FIG. 12, which depicts a process 1200 for generating the overflow panel 421 (FIGS. 4-11), in accordance with embodiments of this disclosure. Process 1200 (and/or any of the functionality described herein may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order or a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 1200 or any other functionality described herein.

Per block 1210, particular embodiments determine an orientation or mode of a computing device, such as the user device 102a (FIG. 1). In some embodiments, the orientation mode of the computing device may include a tablet mode, mobile mode, desktop mode, or the like, and further may be based on sensor feedback from the computing device. In one embodiment, the orientation mode includes a pre-set and/or user customizable display setting for presenting content in a particular arrangement (e.g., in the tablet mode or the desktop mode). Some embodiments of block 1210 may be carried out using the presentation component 212 (FIG. 2). Additional details of the embodiments of block 1210, or for carrying out the operations of block 1210, are described in connection with FIG. 2, and more particular, the presentation component 212.

Per block 1220, some embodiments generate a task bar 310 (FIGS. 3-11) on the GUI displayed on the computing device based on the orientation or mode. Additionally, FIGS. 3-11 include a number of screenshots corresponding to the GUIs, which may be generated by the presentation component 212. For example, the task bar 310 may be located toward the bottom of the screen and include a plurality of pinned application indicators 312 (FIG. 3-11), as discussed above. Some embodiments of block 1220 may be carried out using the presentation component 212 (FIG. 2) and/or the overflow tool provider 226 (FIG. 2). Additional details of the embodiments of block 1220, or for carrying out the operations of block 1220, are described in connection with FIG. 2, and more particular, the presentation component 212 and/or overflow tool provider 226.

Per block 1230, certain embodiments determine a coordinate space of the task bar 310. Certain embodiments may determine a position and size of the region on which the pinned application indicators are positioned. For example, certain embodiments may determine that the task bar 310 is positioned toward the bottom border of the GUI and is sized to accommodate one row or one column of pinned application indicators. Some embodiments of block 1230 may be carried out using the overflow tool positioner 240 (FIG. 2). Additional details of the embodiments of block 1230, or for carrying out the operations of block 1230, are described in connection with FIG. 2, and more particular, the overflow tool positioner 240.

Per block 1240, certain embodiments determine or calculate a distance offset, from the coordinate space of the task bar, for the overflow panel. For example, with reference to FIGS. 4-11, some embodiments may determine a distance offset for a position of the overflow panel 421 from the coordinate space of the taskbar 310. Determination or calculation of the distance offset for the overflow panel may be based on a number of overflow applications that are in use, as discussed above with respect to the overflow application classifier 222 (FIG. 2). For example, the distance offset may include a horizontal and vertical displacement from a position on the coordinate space, such as the end of the task bar 310, to the beginning or the center of the overflow panel 421. As such, the overflow panel 421 may include overflow application indicators 422 that are placed on an appended portion of the task bar 310 following the pinned application indicators 312, and then the appended portion to the task bar 310 that includes the pinned application indicators 312 is displaced by the calculated or determined distance offset as discussed with respect to the overflow tool positioner 240 of FIG. 2. In some embodiments, the method for calculating the distance offset may be based on overflow application logic 235 described in connection with FIG. 2.

Continuing with FIG. 12 and per block 1250, certain embodiments include generating the overflow panel 421 on the GUI based on the distance offset, the coordinate space of the task bar 310, the orientation, mode, and/or any of the application metric data 232 accumulated or determined by the application metric collection component 210 of FIG. 2. GUIs including the overflow panel 421 are depicted with respect to FIGS. 4-11. Some embodiments of block 1250 may be carried out using the presentation component 212 and/or the overflow tool provider 226. Additional details of the embodiments of block 1250, or for carrying out the operations of block 1310, are described in connection with FIG. 2, and more particular, the presentation component 212 and/or the overflow tool provider 226.

Figure 13:
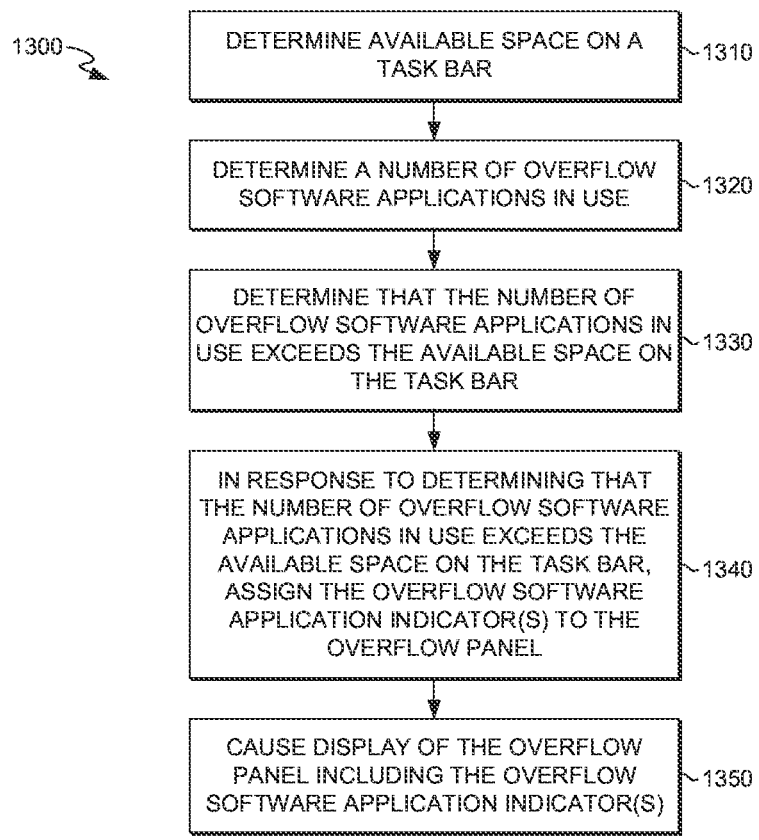
FIG. 13 is a flow diagram of an example process for generating the overflow panel of FIGS. 4-11 based at least on a number of overflow application indicators exceeding an available space on the task bar, according to some embodiments of this disclosure.

Turning now to FIG. 13, which depicts a process 1300 for generating the overflow panel 421 (FIGS. 4-11) based at least on a number of overflow application indicators exceeding an available space on the task bar 310 (FIGS. 3-11), in accordance with embodiments of this disclosure. Process 1300 and/or any of the functionality described herein may be performed by processing logic that comprises hardware (e.g., circuitry, dedicated logic, programmable logic, microcode, or other hardware), software (e.g., instructions executed by a processor, which may perform hardware simulation), firmware, or a combination thereof. Although particular blocks described in this disclosure are referenced in a particular order or a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 1300 or any other functionality described herein.

Per block 1310, particular embodiments determine available space on the task bar 310. The available space on the task bar may correspond to the region on the task bar that is not yet occupied by pinned application indicators. Some embodiments of block 1310 may be carried out using the overflow application classifier 222 (FIG. 2). Additional details of the embodiments of block 1310, or for carrying out the operations of block 1310, are described in connection with FIG. 2, and more particular, the overflow application classifier 222.

Per block 1320, certain embodiments determine a number of overflow applications in use. As discussed above, "in use" generally means having been launched and remaining open in either an active or suspended state. For example, when an application is launched it may remain "in use" until the application is closed and the session is terminated. Some embodiments of block 1320 may be carried out using the overflow application classifier 222. Additional details of the embodiments of block 1320, or for carrying out the operations of block 1320, are described in connection with FIG. 2, and more particular, the overflow application classifier 222.

Per block 1330, certain embodiments determine that the number of overflow applications in use correspond to overflow application indicators 412 (FIGS. 4-11) that exceed the available space on the task bar 310. As discussed above, the pinned application indicators 312 may occupy space on the task bar 310 such that the available space is insufficient to accommodate all or some of the overflow application indicators 422. Additionally or alternatively, the pinned application indicators 312 may occupy all space on the task bar such that there is no available space to accommodate any of the overflow application indicators 422. Some embodiments of block 1330 may be carried out using the overflow application classifier 222. Additional details of the embodiments of block 1330, or for carrying out the operations of block 1330, are described in connection with FIG. 2, and more particular, the overflow application classifier 222.

Per block 1340, certain embodiments assign the overflow application indicators 412 to the overflow panel 421 in response to determining that the overflow application indicators corresponding to the number of overflow applications in use exceeds the available space on the task bar 310. In some embodiments, whether the overflow application indicators 412 are assigned to the overflow panel 421 may be based on the application metric data 232 (FIG. 2) collected by the application metric collection component 210 (FIG. 2). Some embodiments of block 1340 may be carried out using the overflow application classifier 222 and/or the overflow application sequencer 224. Additional details of the embodiments of block 1340, or for carrying out the operations of block 1340, are described in connection with FIG. 2, and more particular, the overflow application classifier 222 and/or the overflow application sequencer 224.

Per block 1350, certain embodiments generate the overflow panel 421 including the overflow application indicators 412. Examples of the generated overflow panel 421 are illustrated in the screenshots of FIGS. 4-11. As discussed above, the overflow panel 421 may be part of the overflow tool 420 (FIG. 4-11), which may also include the MRU slot 320 (FIG. 3), the overflow expansion control 410 (FIG. 4), and/or the extended user interface element 1110 (FIG. 11). Some embodiments of block 1350 may be carried out using the overflow tool provider 226 (FIG. 2) and/or the overflow tool positioner 240 (FIG. 2). Additional details of the embodiments of block 1350, or for carrying out the operations of block 1350, are described in connection with FIG. 2, and more particular, the overflow tool provider 226 and/or the overflow tool positioner 240.

OTHER EMBODIMENTS

In some embodiments, one or more computer storage media having computer-executable instructions embodied thereon that when executed by a hardware processor, cause the hardware process to perform a method. The method may include determining, by the hardware processor device, an available space on a task bar of a graphical user interface (GUI). The available space indicates one or more first applications in use, and the task bar includes one or more first application indicators corresponding to the one or more first applications. The method may include a number of one or more second application indicators corresponding to one or more second applications that have been launched and remain either in an active or suspended state. The method may include determining that the number of one or more second application indicators exceeds the available space on the task bar. The method may include, in response to determining that the number of one or more second application indicators exceeds the available space, assigning at least one second application indicator of the one or more second application indicators to an overflow panel. The method may including causing to display the overflow panel including the at least one second application indicator in response to receiving an indication of a user interaction with the task bar. Advantageously, these and other embodiments, as described herein, modify conventional GUI operations to provide more efficient access to frequently used or recently used computer applications. In particular, computer GUI technology is improved by providing an overflow panel that may be dynamically updated to display relevant overflow applications, thereby improving the ease of access to those overflow applications. Further, by providing the overflow panel according to certain embodiments described herein, computational resources, including processing operations and energy consumption are conserved because access the overflow applications are more efficient. Still further, in some embodiments, the overflow panel may be generated as an extension of a task bar, thereby reducing the computational burden associated with generating the overflow panel since the overflow panel may be configured as an extension of the task bar that is offset by a target distance. In this manner, aspects of existing GUI design may be preserved, while reducing the computation resources utilized to improve access to most recently used software applications.

In any combination of the above embodiments, the determining the available space may include determining whether the one or more second applications are classified the same as the one or more first applications to be indicated on the task bar.

In any combination of the above embodiments, the one or more first applications are classified as pinned applications, the pinned applications are pinned to the task bar, and the one or more second applications are classified differently from the one or more first applications and are not pinned to the task bar.

In any combination of the above embodiments, the method may further include, in response to receiving an indication of a user interaction with the at least one second application indicator on the overflow panel, generating an extended user interface element comprising a preview version of a user interface of an application corresponding to the at least one second application indicator.

In any combination of the above embodiments, the task bar is arranged on the GUI along a first axis, and the overflow panel is arranged on the GUI along a second axis different than the first axis.

In any combination of the above embodiments, the first axis is parallel to the second axis, the first axis is perpendicular to the second axis, or the first axis intersects the second axis at an angle other than 90 degrees.

In any combination of the above embodiments, the method may further include, in response to receiving an indication of a user interaction with panel size adjuster of the overflow panel, scrolling through the overflow panel, enlarge the overflow panel, or both, to view additional second application indicators of the one or more second applications.

In any combination of the above embodiments, the method may further include determining that at least one application of the one or more first applications, the one or more second applications, or both, requires a user input; the method may also include generating an emphasis notification on at least one application indicator corresponding to the at least one application. The emphasis notification may visually distinguish the at least one application indicator from application indicators corresponding to applications not requiring the user input.

In any combination of the above embodiments, the generating of the overflow panel includes causing the hardware processor device to arrange the at least one second application indicator from most recently used to least recently used.

In any combination of the above embodiments, the method may further include determining that another second application of the one or more second applications has been accessed, and updating an order of application indicators on the overflow panel to place an indicator corresponding to the accessed other second application toward the beginning of the order.

In some embodiments, a computerized system, such as the system described in any of the embodiments above, comprises a display, a hardware processor device, and a storage resource storing computer-readable instructions stored thereon which, when executed by the hardware processor devices, implement a method. The method comprises causing a graphical user interface (GUI) to be presented on the display, such that the GUI comprises (i) a work region, (ii) a task bar, (iii) an overflow expansion control, and (iv) a most recently used (MRU) slot. The task bar may include at least one application indicator that is pinned to the task bar, wherein an indicator corresponding to a first unpinned application displayed on the MRU slot is omitted from the task bar. The method includes receiving an indication of a user interaction with a second unpinned application. The method includes, in response to the user interaction, (1) causing the indicator corresponding to the first unpinned application displayed on the MRU slot to be replaced with an indicator corresponding to the second unpinned application, and (2) causing an overflow panel to display a reorganized arrangement of a plurality of indicators corresponding to a plurality of unpinned applications to rearrange the indicator corresponding to the second unpinned application to a beginning of a listing of the plurality of indicators on the overflow panel. Advantageously, these and other embodiments, as described herein, modify conventional GUI operations to provide efficient access to frequently used or recently used computer applications. In particular, computer GUI technology is improved by providing an overflow panel that may be dynamically updated to display indications for relevant overflow applications based on a number of factors, thereby improving the ease of access to those overflow applications. Further, by providing the overflow panel according to certain embodiments described herein, computational resources, including processing operations and energy consumption are conserved because access the overflow applications are more efficient. Still further, in some embodiments, the overflow panel may be generated as an extension of the task bar, thereby reducing the computational burden associated with generating the overflow panel since the overflow panel may be configured as an extension of the task bar that is offset by a target distance. In this manner, aspects of an existing GUI design may be preserved, while reducing the computation resources utilized to improve access to most recently used software applications.

In any combination of the above embodiments of the system, the method may include, in response to receiving another user interaction with a respective indicator, on the overflow panel, of a respective unpinned application of the plurality of unpinned applications, causing an extended user interface element previewing content of the respective unpinned application to be generated on the work region, such that the extended user interface occupies less than a total area of the work region.

In any combination of the above embodiments of the system, the overflow panel is positioned between the extended user interface element and the overflow expansion control.

In any combination of the above embodiments of the computerized system, the method includes, in response to receiving another user interaction with the overflow expansion control, causing the overflow panel to be generated on the work region.

In any combination of the above embodiments of the system, the overflow panel is generated to include the plurality of indicators corresponding to the plurality of unpinned applications arranged along a first axis, and the plurality of pinned applications on the task bar are arranged along a second axis.

In any combination of the above embodiments of the system, the e first axis is parallel to the second axis, the first axis is perpendicular to the second axis, or the first axis intersects the second axis at an angle other than 90 degrees.

In some embodiments, a computer-implemented method is provided. The method may include determining a physical orientation or operating mode of a computing device. The method may include generating a task bar on a graphical user interface (GUI) presented on a display of the computing device, such that the task bar comprises a first plurality of application indicators corresponding to a first plurality of applications that have been pinned to the task bar. The method may include determining a coordinate space of the task bar, such that the coordinate space comprises a position of the task bar relative to the GUI and a size of the task bar relative to the GUI. The method may include determining a distance offset from the task bar based on the coordinate space of the task bar. The method may include generating an overflow panel on the GUI based on the distance offset, the coordinate space of the task bar, the physical orientation, or the operating mode, or a combination thereof. The overflow panel may include a second plurality of application indicators that correspond to a second plurality of applications that have been launched and remain open either in an active or a suspended state. Advantageously, these and other embodiments, as described herein, modify conventional GUI operations to provide more efficient access to frequently used or recently used computer applications. In particular, computer GUI technology is improved by providing an overflow panel that may be dynamically updated to display indications for relevant overflow applications based on any number of factors (e.g., the distance offset, the coordinate space of the task bar, the physical orientation, or the operating mode, or a combination thereof), thereby improving the ease of access to those overflow applications. Further, by providing the overflow panel according to certain embodiments described herein, computational resources, including processing operations and energy consumption are conserved because access the overflow applications are more accessible. Still further, in some embodiments, the overflow panel may be generated as an extension of the task bar, thereby reducing the computational burden associated with generating the overflow panel since the overflow panel may be configured as an extension of the task bar that is offset by a target distance. In this manner, aspects of an existing GUI design may be preserved, while reducing the computation resources utilized to improve access to most recently used software applications.

In any combination of the above embodiments generating the overflow panel includes receiving a user interaction with an application indicator of the second plurality of application indicators on the overflow panel, determining a second distance offset from the overflow panel, and generating an extended user interface element comprising content of an application corresponding to the application indicator based on the user interaction and the second distance offset.

In any combination of the above embodiments, generating the overflow panel may include extending the size of the task bar, generating the second plurality of application indicators on the extended portion of the task bar, removing the extended portion of the task bar, and offsetting the extended portion of the task bar from the task bar by the distance offset, wherein the extended portion corresponds to the overflow panel.

In any combination of the above embodiments, the operating mode includes a tablet mode or a desktop mode.

Overview of Exemplary Operating Environment

Figure 14:
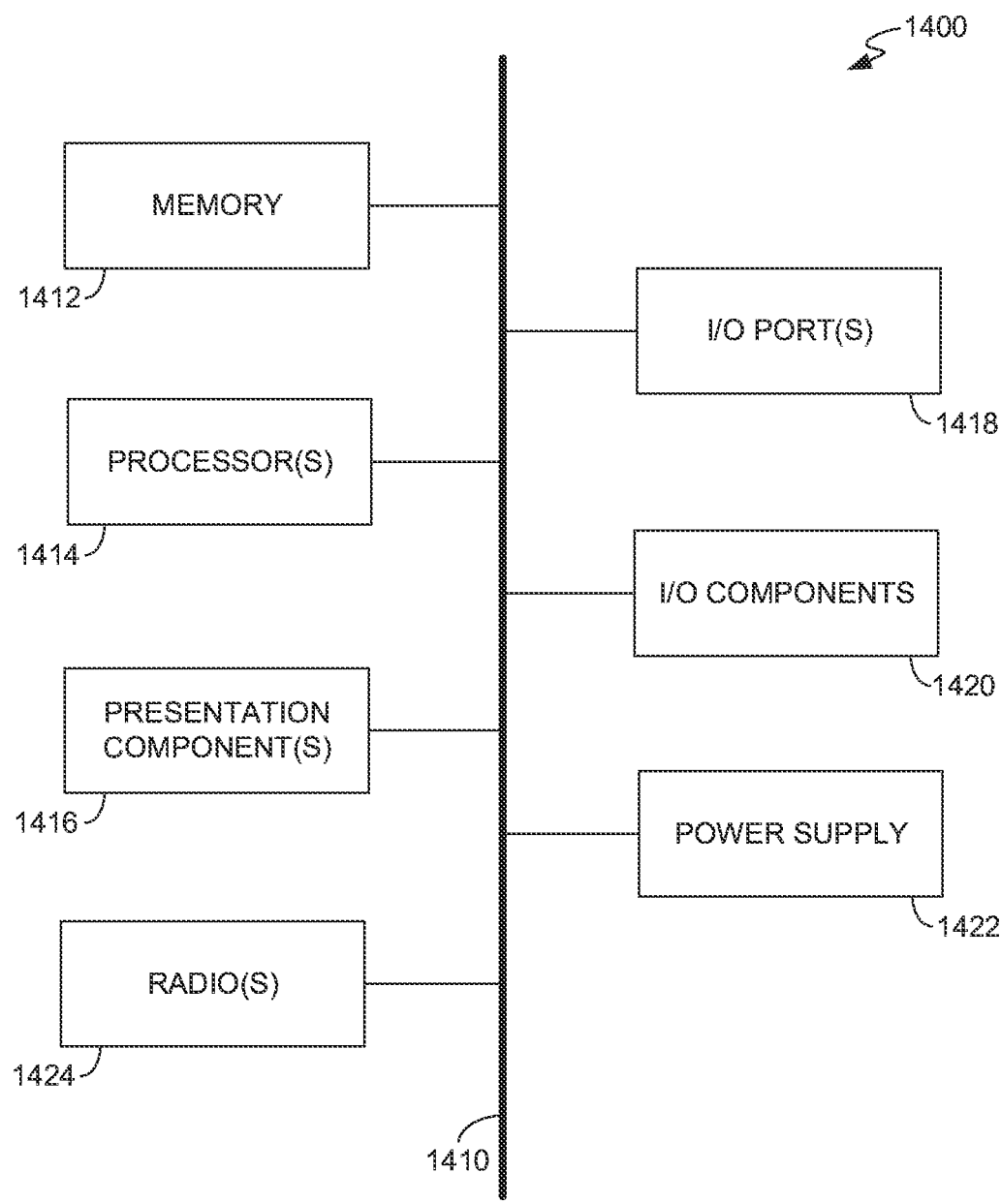
FIG. 14 is a block diagram of a computing device for which embodiments of this disclosure are employed.

Having described various embodiments of the disclosure, an exemplary computing environment suitable for implementing embodiments of the disclosure is now described. With reference to FIG. 14, an exemplary computing device is provided and referred to generally as computing device 1400. The computing device 1400 is but one example of a suitable computing environment and is not intended to suggest any limitation as to the scope of use or functionality of the disclosure. Neither should the computing device 1400 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 14, computing device 1400 includes a bus 1410 that directly or indirectly couples the following devices: memory 1412, one or more processors 1414, one or more presentation components 1416, one or more input/output (I/O) ports 1418, one or more I/O components 1420, and an illustrative power supply 1422. Bus 1410 represents what may be one or more busses (such as an address bus, data bus, or combination thereof). Although the various blocks of FIG. 14 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 14 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 14 and with reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media Memory 1412 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors 1414 that read data from various entities such as memory 1412 or I/O components 1420. Presentation component(s) 1416 presents data indications to a user or other device. Exemplary presentation components include a display device, speaker, printing component, vibrating component, and the like.

The I/O ports 1418 allow computing device 1400 to be logically coupled to other devices, including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1400. The computing device 1400 may be equipped with depth cameras, such as stereoscopic camera systems, infrared camera systems, red-green-blue (RGB) camera systems, and combinations of these, for gesture detection and recognition. Additionally, the computing device 1400 may be equipped with accelerometers or gyroscopes that enable detection of motion. The output of the accelerometers or gyroscopes may be provided to the display of the computing device 1400 to render immersive augmented reality or virtual reality.

Some embodiments of computing device 1400 may include one or more radio(s) 1424 (or similar wireless communication components). The radio 1424 transmits and receives radio or wireless communications. The computing device 1400 may be a wireless terminal adapted to receive communications and media over various wireless networks. Computing device 1400 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a wireless local-area network (WLAN) connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Example Distributed Computing System Environment

Figure 15:
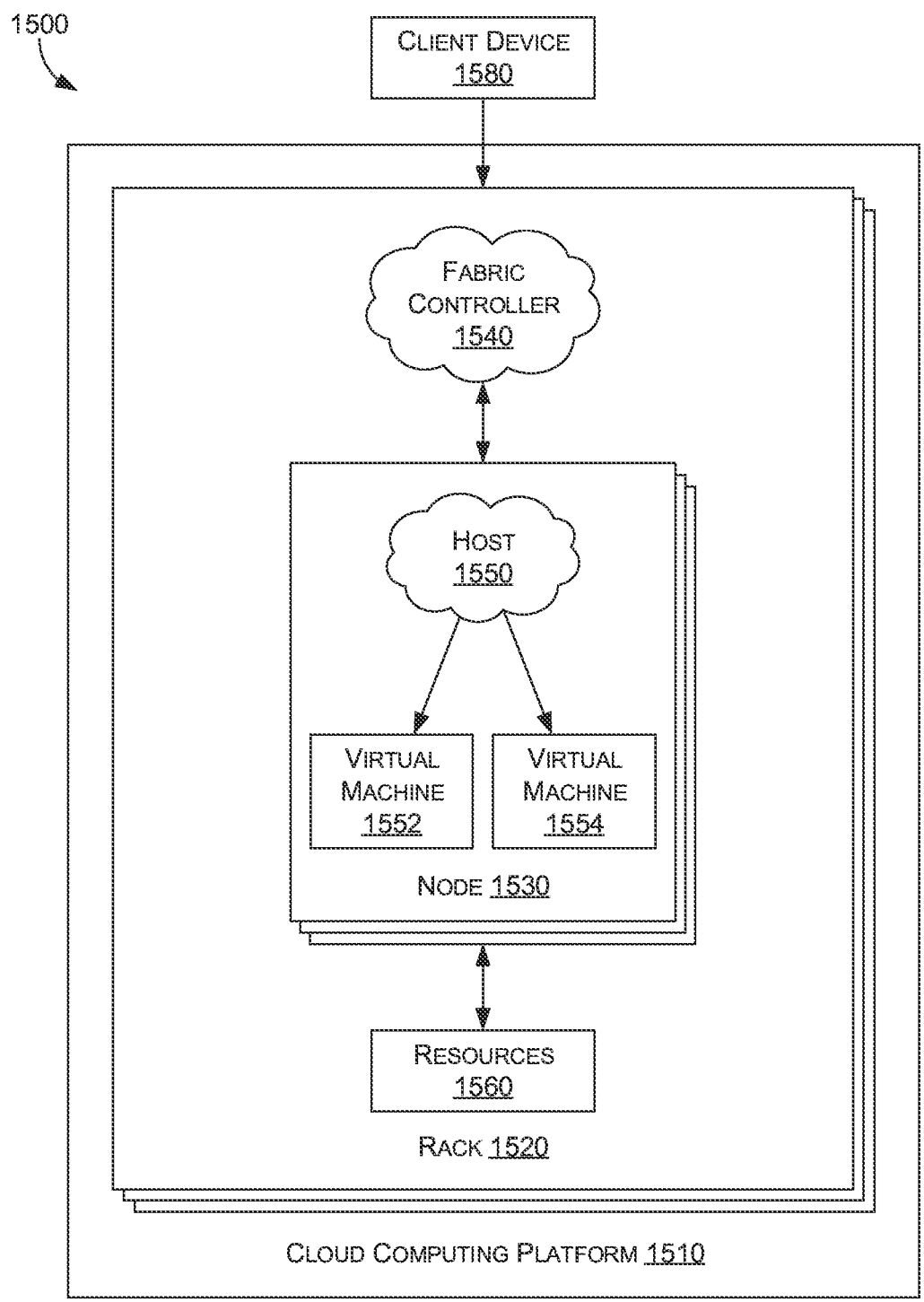
FIG. 15 is a block diagram of a computing environment in which embodiments of the present disclosure may be employed.

Referring now to FIG. 15, FIG. 15 illustrates an example distributed computing environment 1500 in which implementations of the present disclosure may be employed. In particular, FIG. 15 shows a high level architecture of an example cloud computing platform 1510 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 1500 that includes cloud computing platform 1510, rack 1520, and node 1530 (e.g., computing devices, processing units, or blades) in rack 1520. The technical solution environment can be implemented with cloud computing platform 1510 that runs cloud services across different data centers and geographic regions. Cloud computing platform 1510 can implement fabric controller 1540 component for provisioning and managing resource allocation, deployment, upgrade, and management of cloud services. Typically, cloud computing platform 1510 acts to store data or run service applications in a distributed manner. Cloud computing infrastructure 1510 in a data center can be configured to host and support operation of endpoints of a particular service application. Cloud computing infrastructure 1510 may be a public cloud, a private cloud, or a dedicated cloud.

Node 1530 can be provisioned with host 1550 (e.g., operating system or runtime environment) running a defined software stack on node 1530. Node 1530 can also be configured to perform specialized functionality (e.g., compute nodes or storage nodes) within cloud computing platform 1510. Node 1530 is allocated to run one or more portions of a service application of a tenant. A tenant can refer to a customer utilizing resources of cloud computing platform 1510. Service application components of cloud computing platform 1510 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1530, nodes 1530 may be partitioned into virtual machines (e.g., virtual machine 1552 and virtual machine 1554). Physical machines can also concurrently run separate service applications. The virtual machines or physical machines can be configured as individualized computing environments that are supported by resources 1560 (e.g., hardware resources and software resources) in cloud computing platform 1510. It is contemplated that resources can be configured for specific service applications. Further, each service application may be divided into functional portions such that each functional portion is able to run on a separate virtual machine. In cloud computing platform 1510, multiple servers may be used to run service applications and perform data storage operations in a cluster. In particular, the servers may perform data operations independently but exposed as a single device referred to as a cluster. Each server in the cluster can be implemented as a node.

Client device 1580 may be linked to a service application in cloud computing platform 1510. Client device 1580 may be any type of computing device, such as user device 102a described with reference to FIG. 1, and the client device 1580 can be configured to issue commands to cloud computing platform 1510. In embodiments, client device 1580 may communicate with service applications through a virtual Internet Protocol (IP) and load balancer or other means that direct communication requests to designated endpoints in cloud computing platform 1510. The components of cloud computing platform 1510 may communicate with each other over a network (not shown), which may include, without limitation, one or more local area networks (LANs) and/or wide area networks (WANs).

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A system, comprising:
a display;
at least one hardware processor device; and
a storage resource storing computer-readable instructions thereon which, when executed by the at least one hardware processor device, cause the system to:
cause a graphical user interface (GUI) of an operating system to be presented on the display, wherein the GUI comprises (i) a work region, (ii) a task bar, (iii) an overflow expansion control, and (iv) a most recently used (MRU) slot, wherein the task bar comprises at least one application indicator that is pinned to the task bar, and that is selectable to open a corresponding application into an active or suspended state on the operating system, wherein an indicator corresponding to a first unpinned application operating on the operating system displayed on the MRU slot is not positioned on the task bar and is selectable to open the first unpinned application into the active or suspended state on the operating system;
receive an indication of a user interaction with a second unpinned application operating on the operating system; and
in response to the user interaction,
cause the indicator corresponding to the first unpinned application displayed on the MRU slot to be replaced with an indicator that (1) corresponds to the second unpinned application, that (2) is selectable, via an overflow panel corresponding to a GUI element generated on the work region, to open the second unpinned application into the active or suspended state on the operating system, and that (3) is not positioned on the task bar; and
cause the overflow panel to display a reorganized arrangement of a plurality of indicators corresponding to a plurality of unpinned applications to rearrange the indicator corresponding to the second unpinned application to a beginning of a listing of the plurality of indicators on the overflow panel.

2. The system of claim 1, wherein the computer-readable instructions further cause the system to:
in response to receiving another user interaction with the overflow expansion control, cause the overflow panel to be generated on the work region.

3. The system of claim 1, wherein the overflow panel is generated to include the plurality of indicators corresponding to the plurality of unpinned applications arranged along a first axis, and a plurality of pinned applications on the task bar are arranged along a second axis, wherein the first axis is parallel to the second axis, the first axis is perpendicular to the second axis, or the first axis intersects the second axis at an angle other than 90 degrees.

4. The system of claim 1, wherein the MRU slot and the overflow panel both simultaneously comprise at least one of (1) the indicator corresponding to the first unpinned application or (2) the indicator corresponding to the second unpinned application.

5. The system of claim 1, wherein the overflow panel and the MRU slot are positioned collinearly with the task bar.

6. The system of claim 1, wherein the MRU slot and the overflow expansion control are arranged collinearly with respect to the at least one application indicator that is pinned to the task bar.

7. The system of claim 1, wherein at least one of the (1) indicator corresponding to the first unpinned application or (2) the indicator corresponding to the second unpinned application comprises a status indicator visual indicating that the corresponding application is in the active or suspended state.

8. The system of claim 1, wherein the computer-readable instructions further cause the system to:
in response to receiving another user interaction with a respective indicator, on the overflow panel, of a respective unpinned application of the plurality of unpinned applications, cause an extended user interface element previewing content of the respective unpinned application to be generated on the work region, and wherein the extended user interface element occupies less than a total area of the work region.

9. The system of claim 8, wherein the overflow panel is positioned between the extended user interface element and the overflow expansion control.

10. A computer storage medium storing computer-readable instructions thereon which, when executed by at least one hardware processor device, cause a computing system to:
cause a graphical user interface (GUI) of an operating system to be presented on a display, wherein the GUI comprises (i) a work region, (ii) a task bar, (iii) an overflow expansion control, and (iv) a most recently used (MRU) slot, wherein the task bar comprises at least one application indicator that is pinned to the task bar, and that is selectable to open a corresponding application into an active or suspended state on the operating system, wherein an indicator corresponding to a first unpinned application operating on the operating system displayed on the MRU slot is not positioned on the task bar and is selectable to open the first unpinned application into the active or suspended state on the operating system;

receive an indication of a user interaction with a second unpinned application operating on the operating system; and in response to the user interaction, cause the indicator corresponding to the first unpinned application displayed on the MRU slot to be replaced with an indicator that (1) corresponds to the second unpinned application, that (2) is selectable, via an overflow panel corresponding to a GUI element generated on the work region, to open the second unpinned application into the active or suspended state on the operating system, and that (3) is not positioned on the task bar; and cause the overflow panel to display a reorganized arrangement of a plurality of indicators corresponding to a plurality of unpinned applications to rearrange the indicator corresponding to the second unpinned application to a beginning of a listing of the plurality of indicators on the overflow panel.

11. The computer storage medium of claim 10, wherein the computer-readable instructions further cause the hardware processor device to:

in response to receiving another user interaction with the overflow expansion control, cause the overflow panel to be generated on the work region.

12. The computer storage medium of claim 10, wherein the overflow panel is generated to include the plurality of indicators corresponding to the plurality of unpinned applications arranged along a first axis, and a plurality of pinned applications on the task bar are arranged along a second axis, wherein the first axis is parallel to the second axis, the first axis is perpendicular to the second axis, or the first axis intersects the second axis at an angle other than 90 degrees.

13. The computer storage medium of claim 10, wherein the MRU slot and the overflow panel both simultaneously comprise an indication of the second unpinned application.

14. The computer-readable storage media of claim 10, wherein the overflow panel and the MRU slot are positioned collinearly with the task bar.

15. The computer storage medium of claim 10, wherein at least one of the (1) indicator corresponding to the first unpinned application or (2) the indicator corresponding to the second unpinned application comprises a status indicator visual indicating that the corresponding application is in the active or suspended state.

16. The computer storage medium of claim 10, wherein the computer-readable instructions further cause the computing system to:

in response to receiving another user interaction with a respective indicator, on the overflow panel, of a respective unpinned application of the plurality of unpinned applications, cause an extended user interface element previewing content of the respective unpinned application to be generated on the work region, and wherein the extended user interface element occupies less than a total area of the work region.

17. The computer storage medium of claim 16, wherein the overflow panel is positioned between the extended user interface element and the overflow expansion control.

18. A computer-implemented method, comprising:

causing a graphical user interface (GUI) of an operating system to be presented on a display, wherein the GUI comprises (i) a work region, (ii) a task bar, (iii) an overflow expansion control, and (iv) a most recently used (MRU) slot, wherein the task bar comprises at least one application indicator that is pinned to the task bar, and that is selectable to open a corresponding application into an active or suspended state on the operating system, wherein an indicator corresponding to a first unpinned application operating on the operating system displayed on the MRU slot is not positioned on the task bar and is selectable to open the first unpinned application into the active or suspended state on the operating system;

receiving an indication of a user interaction with a second unpinned application operating on the operating system; and in response to the user interaction, causing the indicator corresponding to the first unpinned application displayed on the MRU slot to be replaced with an indicator that (1) corresponds to the second unpinned application, that (2) is selectable, via an overflow panel corresponding to a GUI element generated on the work region, to open the second unpinned application into the active or suspended state on the operating system, and that (3) is not positioned on the task bar; and causing the overflow panel to display a reorganized arrangement of a plurality of indicators corresponding to a plurality of unpinned applications to rearrange the indicator corresponding to the second unpinned application to a beginning of a listing of the plurality of indicators on the overflow panel.

19. The computer-implemented method of claim 18, further comprising:

in response to receiving another user interaction with a respective indicator, on the overflow panel, of a respective unpinned application of the plurality of unpinned applications, causing an extended user interface element previewing content of the respective unpinned application to be generated on the work region, and wherein the extended user interface element occupies less than a total area of the work region.

20. The computer-implemented method of claim 18, further comprising, in response to receiving another user interaction with the overflow expansion control, causing the overflow panel to be generated on the work region.

* * * * *